United States Patent
Barnett, Jr.

(10) Patent No.: US 10,931,474 B2
(45) Date of Patent: Feb. 23, 2021

(54) CASCADED DISTRIBUTION POINT UNIT ARCHITECTURE FOR AN ADAPTIVE NETWORK ACCESS SYSTEM

(71) Applicant: CenturyLink Intellectual Property LLC, Broomfield, CO (US)

(72) Inventor: Thomas C. Barnett, Jr., Monroe, LA (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 61 days.

(21) Appl. No.: 16/446,428

(22) Filed: Jun. 19, 2019

(65) Prior Publication Data
US 2020/0351118 A1    Nov. 5, 2020

Related U.S. Application Data

(60) Provisional application No. 62/841,584, filed on May 1, 2019.

(51) Int. Cl.
| | |
|---|---|
| *H04L 12/28* | (2006.01) |
| *H04L 12/721* | (2013.01) |
| *H04L 12/761* | (2013.01) |

(52) U.S. Cl.
CPC ...... *H04L 12/2861* (2013.01); *H04L 12/2889* (2013.01); *H04L 45/16* (2013.01); *H04L 45/66* (2013.01)

(58) Field of Classification Search
CPC ..... H04L 12/2861; H04L 45/66; H04L 45/16; H04L 12/2889; H04L 12/2816
See application file for complete search history.

(56) References Cited

U.S. PATENT DOCUMENTS

| | | | |
|---|---|---|---|
| 8,411,696 B1 * | 4/2013 | Ko | H04L 12/2869 370/419 |
| 2017/0272581 A1 * | 9/2017 | Cooper | G05F 1/66 |
| 2018/0269992 A1 * | 9/2018 | Torres | H04L 12/12 |
| 2019/0044813 A1 * | 2/2019 | Oksman | H04L 45/16 |
| 2019/0082244 A1 * | 3/2019 | Al Rawi | H04Q 11/0071 |

OTHER PUBLICATIONS

TR-301, "Architecture and Requirements for Fiber to the Distribution Point", Issue: 2 Corrigendum 1, Issue Date: Mar. 2019 (Year: 2019).*

* cited by examiner

*Primary Examiner* — Moo Jeong

(57) ABSTRACT

A system includes a first distribution point unit comprising a first backhaul interface coupled to an access network via a backhaul connection, a first distribution interface coupled to a downstream distribution point unit, one or more first drop cable interfaces coupled to at least one first customer premises via at least one first drop cable, and a first reverse power section. The system further includes a second distribution point unit communicatively coupled to the first distribution point unit, the second distribution point unit comprising a second backhaul interface coupled to the first distribution interface of the first distribution point unit, a second distribution interface configured to be coupled to a subsequent downstream distribution point unit, one or more second drop cable interfaces coupled to at least one second customer premises via at least one second drop cable, and a second reverse power section.

20 Claims, 19 Drawing Sheets

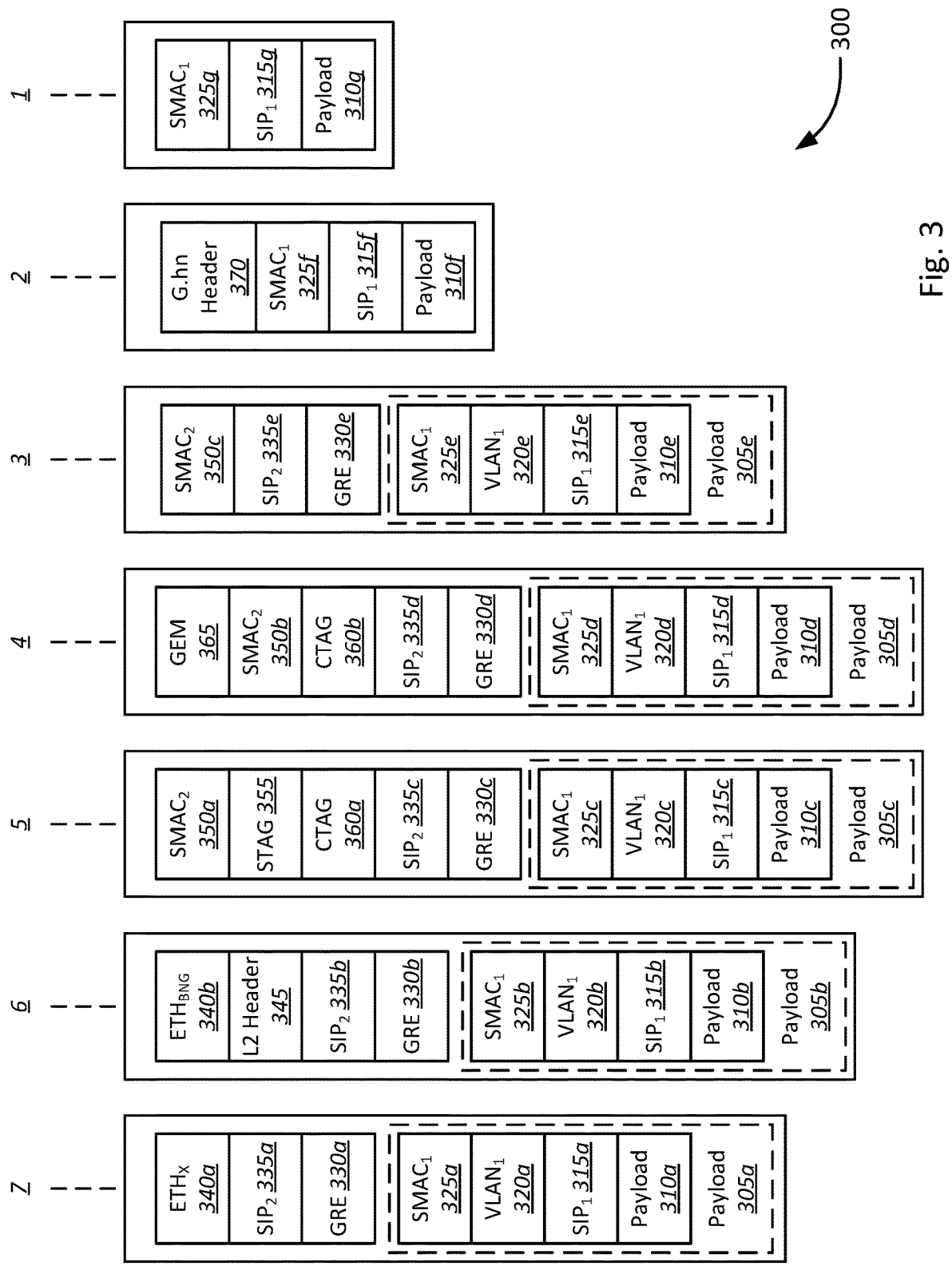

CASCADED DISTRIBUTION POINT UNIT ARCHITECTURE FOR AN ADAPTIVE NETWORK ACCESS SYSTEM

CROSS REFERENCE TO RELATED APPLICATIONS

This application claims priority to U.S. Provisional Patent Application Ser. No. 62/841,584, filed May 1, 2019 by Thomas C. Barnett, entitled "Cascaded Distribution Point Unit Architecture for an Adaptive Network Access System," the entire disclosure of which is incorporated herein by reference in its entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to network access systems and architecture, and more particularly to network access architectures for over the top network access solutions on existing infrastructure.

BACKGROUND

To provision internet service, traditionally a service provider would connect to a customer premises at a network interface device (NID), and provide customer premises equipment (CPE), such as a residential gateway (RG) or business gateway (BG), to provision internet service to a customer. Widespread legacy infrastructure typically relies on pedestals, cabinets, and/or handholes from which drop cables are run to a subscriber premises. Drop cables typically include various types of copper wire media, such as twisted pair copper cable and coaxial cables. which is coupled to residential homes, or other subscriber premises.

Developments in networking standards and specifications, such as G.hn, G.fast, and G.now have allowed copper wire media, including powerline, to facilitate high-speed data rate communications. A typical network architecture utilizing G.hn specifications for high-speed communications utilize a G.now master and G.now client. The G.now master is typically located at a central office (CO) and is used to provision and manage subscriber network access from respective G.now client devices. G.now client devices, in turn, are typically implemented in residential gateway devices, which must be distributed to current and future customers, and relies on specific customer wiring.

Accordingly, tools and techniques for leveraging existing legacy infrastructure for network access are provided.

BRIEF DESCRIPTION OF THE DRAWINGS

A further understanding of the nature and advantages of the embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIG. 3 is a schematic block diagram of a data plane along the network segments of the example architecture, in accordance with various embodiments;

DETAILED DESCRIPTION OF CERTAIN EMBODIMENTS

Figure 1:
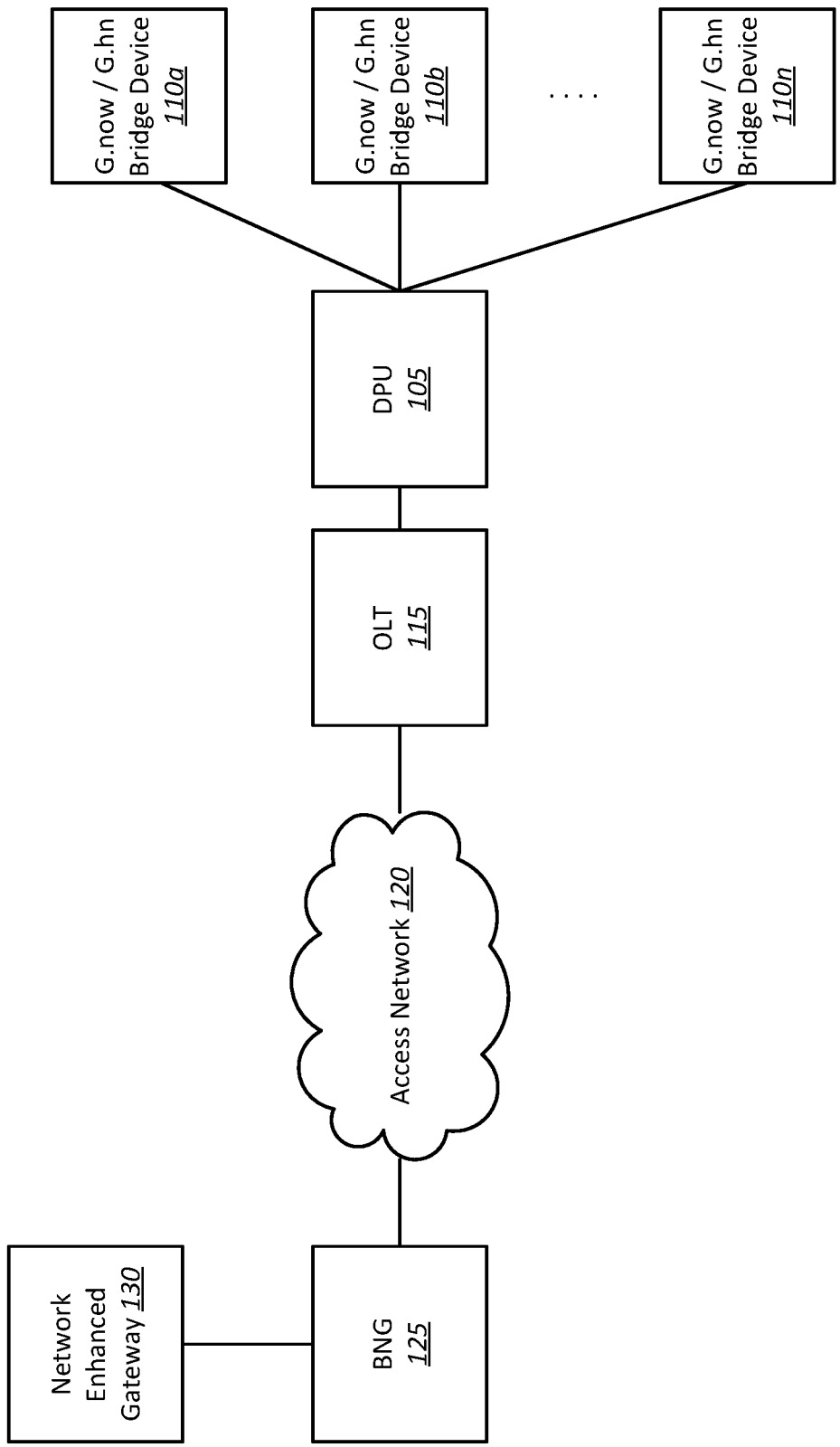
FIG. 1 is a schematic block diagram of an example architecture for supporting a virtualized RG/whitebox NFVI environment, in accordance with various embodiments.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

The various embodiments include, without limitation, methods, systems, and/or software products. Merely by way of example, a method may comprise one or more procedures, any or all of which are executed by a computer system. Correspondingly, an embodiment may provide a computer system configured with instructions to perform one or more procedures in accordance with methods provided by various other embodiments. Similarly, a computer program may comprise a set of instructions that are executable by a computer system (and/or a processor therein) to perform such operations. In many cases, such software programs are encoded on physical, tangible, and/or non-transitory computer readable media (such as, to name but a few examples, optical media, magnetic media, and/or the like).

In an aspect, a system with a cascaded distribution point unit architecture may include a first distribution point unit and a second distribution point unit. The first distribution point unit may include a first backhaul interface coupled to an access network via a backhaul connection, a first distribution interface coupled to a downstream distribution point unit, one or more first drop cable interfaces coupled to at least one first customer premises via at least one first drop cable, a first reverse power section, a first processor, and a first non-transitory computer readable media comprising instructions executable by the first processor to perform various functions. The first distribution unit may, in various embodiments, be configured to establish, via the at least one first drop cable, a first G.now connection to the at least one first customer premises, and receive, via the first backhaul interface, data associated with one or more services from the access network. The first distribution point unit may further be configured to determine whether the one or more services should be provided to the at least one first customer premises, and in response to determining that the one or more services are to be provided to the at least one first customer premises, transmit the data associated with the one or more services to the at least one first customer premises over the first G.now connection. In response to determining that the one or more services are not associated with the at least one first customer premises, the distribution point unit may instead be configured to transmit, via the first distribution interface, the data associated with the one or more services to the downstream distribution point unit.

The second distribution point unit may be communicatively coupled to the first distribution point unit, and further include a second backhaul interface coupled to the first distribution interface of the first distribution point unit, a second distribution interface configured to be coupled to a subsequent downstream distribution point unit, one or more second drop cable interfaces coupled to at least one second customer premises via at least one second drop cable, a second reverse power section, a second processor, and a second non-transitory computer readable media comprising instructions executable by the processor to perform various functions. Thus, the second distribution point unit may be configured to establish, via the at least one second drop cable, a second G.now connection to the at least one second customer premises, and receive, via the first backhaul interface, data associated with one or more services from the first distribution point unit. The second distribution point unit may further be configured to determine whether the one or more services should be provided to the at least one second customer premises, and in response to determining that the one or more services are to be provided to the at least one second customer premises, transmit the data associated with the one or more services to the at least one second customer premises over the second G.now connection. Otherwise, in response to determining that the one or more services are not associated with the at least one second customer premises, the second distribution point unit may be configured to transmit, via the second distribution interface, the data associated with the one or more services to the subsequent downstream distribution point unit.

In another aspect, an apparatus for a cascaded distribution point unit may include a backhaul interface coupled to an access network via a backhaul connection, a distribution interface coupled to a downstream distribution point unit, one or more drop cable interfaces coupled to at least one customer premises via at least one drop cable, a reverse power section, a processor, and a non-transitory computer readable media comprising instructions executable by the processor to perform various functions. Thus, the apparatus may be configured to establish, via the at least one drop cable, a G.now connection to the at least one customer premises, receive, via the backhaul interface, data associated with one or more services from the access network, and determine whether the one or more services should be provided to the at least one customer premises. In response to determining that the one or more services are to be provided to the at least one customer premises, the apparatus may be configured to transmit the data associated with the one or more services to the at least one customer premises over the G.now connection, and in response to determining that the one or more services are not associated with the at least one customer premises, transmit, via the distribution interface, the data associated with the one or more services to the downstream distribution point unit.

In a further aspect, a method of providing network access for a cascaded distribution point unit architecture includes establishing, via a backhaul feed, a backhaul connection between a distribution point unit and an access network, establishing, via a distribution interface, a downstream connection to a downstream distribution point unit, and establishing, via a drop cable, a G.now connection between the distribution point unit and at least one customer premises. The method continues by receiving, via the backhaul connection, data associated with one or more services from the access network, and determining whether the one or more services should be provided to the at least one customer premises. The method further includes, in response to determining that the one or more services are to be provided to the at least one customer premises, transmitting, via the distribution point unit, the data associated with the one or more services to the at least one customer premises over the G.now connection. In response to determining that the one or more services are not associated with the at least one customer premises, the method further includes transmitting, via the distribution point unit, the data associated with the one or more services to the downstream distribution point unit.

Various modifications and additions can be made to the embodiments discussed without departing from the scope of the invention. For example, while the embodiments described above refer to specific features, the scope of this invention also includes embodiments having different combination of features and embodiments that do not include all the above described features.

FIG. 1 is a schematic block diagram of an example architecture for a system supporting a virtualized RG/whitebox network function virtualization infrastructure (NFVI). In various embodiments, the system 100 includes a distribution point unit (DPU) 105, one or more G.now/G.hn bridge device 110a-110n (collectively "G.now/G.hn bridge devices 110"), optical line termination (OLT) 115, access network 120, broadband network gateway (BNG) 125, and network enhanced gateway 130. It should be noted that the various components of the system 100 are schematically illustrated in FIG. 1, and that modifications to the system 100 may be possible in accordance with various embodiments.

In various embodiments, the DPU 105 may be coupled on a downstream side to one or more G.now/G.hn bridge devices 110a-110n, and on an upstream side to the OLT 115. The OLT 115 may be coupled via the access network 120 to the BNG 125. The BNG 125 may further be coupled to the network enhanced gateway 130 in a central office (CO)/exchange, headend, and/or data center.

In various embodiments, parts of the system 100, upstream of the DPU 105 and downstream of the network enhanced gateway 130, may include various types of fiber to the distribution point (FTTdp) access network architectures, as known to those in the art. Accordingly, on the upstream side, the DPU 105 may be configured to be coupled to existing fiber backhaul infrastructure. For example, the DPU 105 may be configured to be coupled to a passive optical network (e.g., PON, GPON, XGPON, NG-PON2, etc.), point to point (P2P) fiber network, or any other type of fiber-optic access network via a backhaul optical fiber. In some further embodiments, the DPU 105 may be configured to be coupled, alternatively, to an existing digital subscriber line (xDSL) backhaul feed.

In various embodiments, on the downstream side, the DPU 105 may be configured to provide one or more respective copper wire drops to respective customer premises on the downstream side. In some embodiments, each of the customer premises may be associated with a respective G.now/G.hn bridge device 110a-110n. Accordingly, the DPU 105 may be coupled to the G.now/G.hn bridge devices 110 via respective copper wire drops. In various embodiments, the DPU 105 may be coupled to each of the G.now/G.hn bridge devices 110a-110n via a respective copper wire drop cable, such as Cat 1 and/or Cat 3 telephone lines and/or coaxial cable. For example, in some embodiments, the DPU 105 may be incorporated as part of existing and/or legacy copper wire infrastructure. The DPU 105, may, in some examples, include and/or interface with legacy plain old telephone service (POTS) and/or xDSL cabinets. Therefore, in some examples, connections from the DPU 105 may be terminated, at respective G.now/G.hn bridge devices 110, via an RJ11 connector. In further embodiments, the DPU 105 may further be configured to receive a reverse power feed (RPF) from one or more customer premises.

In various embodiments, G.now/G.hn bridge devices 110 may be configured to bridge communications from the DPU to respective customer premises. G.now (including G.now wave-2), as known to those in the art, is a network access specification based on G.hn standards, that enables high speed data rates (e.g., >1 Gbps data rates) over copper wire drop cables (e.g., Cat 1, Cat 3, coaxial cable). Accordingly, in various embodiments, the G.now/G.hn bridge devices 110 are configured to bridge communications from the G.now access network communication media to wiring available at each respectively associated customer premises utilizing the G.hn standard. For example, as explained above, downstream communications may be carried from the DPU 105 over respective copper wire drop cables to the respective G.now/G.hn bridge device 110a-110n. The respective G.now/G.hn bridge device 110a-110n may then bridge communications to respective customer premises wiring. For example, in some embodiments, the G.now/G.hn bridge device 110a-110n may bridge communications to twisted pair (e.g., Cat 3, Cat 5, Cat 5e, Cat 6), coaxial cable, fiber optic cable, and/or powerline of a customer premises. Moreover, in various embodiments, the G.now/G.hn bridge device 110a-110n may be configured to mitigate crosstalk from other twisted pairs in the same binder. For example, as known to those in the art, each respective G.now/G.hn bridge device 110a-110n may be configured to perform vectoring, filter cross talk, or implement other crosstalk mitigation techniques as known to those in the art.

As previously described, in various embodiments, the network enhanced gateway 130 may be located in a central office, exchange, headend, and/or data center. In The network enhanced gateway 130 may be configured to host one or more virtualized residential gateways (RG) respectively associated with each customer premise. Thus, in some embodiments, a customer's local area network LAN may be associated logically with a customer premises, but physically be extended to a CO, headend, and/or data center environment.

Accordingly, the network enhanced gateway 130 may include hardware, software, or hardware and software, both physical and/or virtual. In some embodiments, the network enhanced gateway 130 may be implemented on, without limitation, one or more server computers, dedicated custom hardware appliances, programmable logic controllers, single board computers, field programmable gate arrays (FPGA), application specific integrated circuits (ASIC), or a system on a chip (SoC). In various embodiments, the network enhanced gateway 130 may be physical host machine, such as a server or other computer system, configured to host one or more virtual RG instances, and may further include network function virtualization infrastructure (NFVI), such as a hypervisor and/or one or more other NFV/virtualized network function (VNF) management and orchestration systems. Alternatively, the enhanced network gateway 110 may be coupled to remotely located NFV infrastructure (NFVI), including a remotely located hypervisor and/or NFV/VNF management and orchestration systems.

In various embodiments, the enhanced network gateway 110 may be configured to provide a respective consumer portal accessible by a respective customer, via their respective access points 140a-140n, 150, 160 over respective customer LAN 135, 145, 155 connections to the CO 105. Accordingly, in some embodiments, the enhanced network gateway 110 may be configured to present a respective consumer portal for each customer and/or customer LAN. In some examples, the enhanced network gateway 110 may be configured to instantiate a respective virtual RG 115a-115n for each new connection from a respective customer and/or customer LAN. In some examples, the consumer portal may, in turn, be provided via the respective RG 115a-115n. Accordingly, for each customer LAN 135, 145, 155, the enhanced network gateway 110 may be configured to create a logically separated secure domain that provides secure access to network resources and/or services for each respective customer domain. The consumer portal may be configured to allow a customer to select and provision one or more services to receive. For example, the one or more services may include, without limitation, voice, video, and data services.

In some further examples, the consumer portal may be configured to allow a customer to select between one or more service providers. Accordingly, each respective customer premises may be able to access a consumer portal to provision one or more network services from any respective access point coupling the customer premises to the DPU 105, in turn providing connectivity to the network enhanced gateway 130 via the access network 120. Accordingly, potential customers may be able to access a respective consumer portal via, respective existing network infrastructure, and through any of various types of access points and infrastructure already available at a respective customer premises. Thus, regardless of the kind of wiring and/or network infrastructure, Accordingly, functions previously provided by customer-premises equipment (CPE), such as traditional RGs, STBs, voice over internet protocol (VoIP) base stations, etc., may now be pushed further into the service provider network as virtual machines running on a respective network enhanced gateway 130, and vice versa, cloud-based services and functionality is pushed closer to the customer premises. Accordingly, once the one or more services are selected and configured via a consumer portal, the network enhanced gateway 130 may be configured to provide the one or more services to the respective customer over a respective VLAN/customer domain to a respective customer LAN associated with each subscriber/customer premise. The DPU 105 and G.now/G.hn bridge devices 110 may thus allow high speed communications to be seamlessly provided to the respective subscribers over existing and/or legacy infrastructure.

Figure 2:
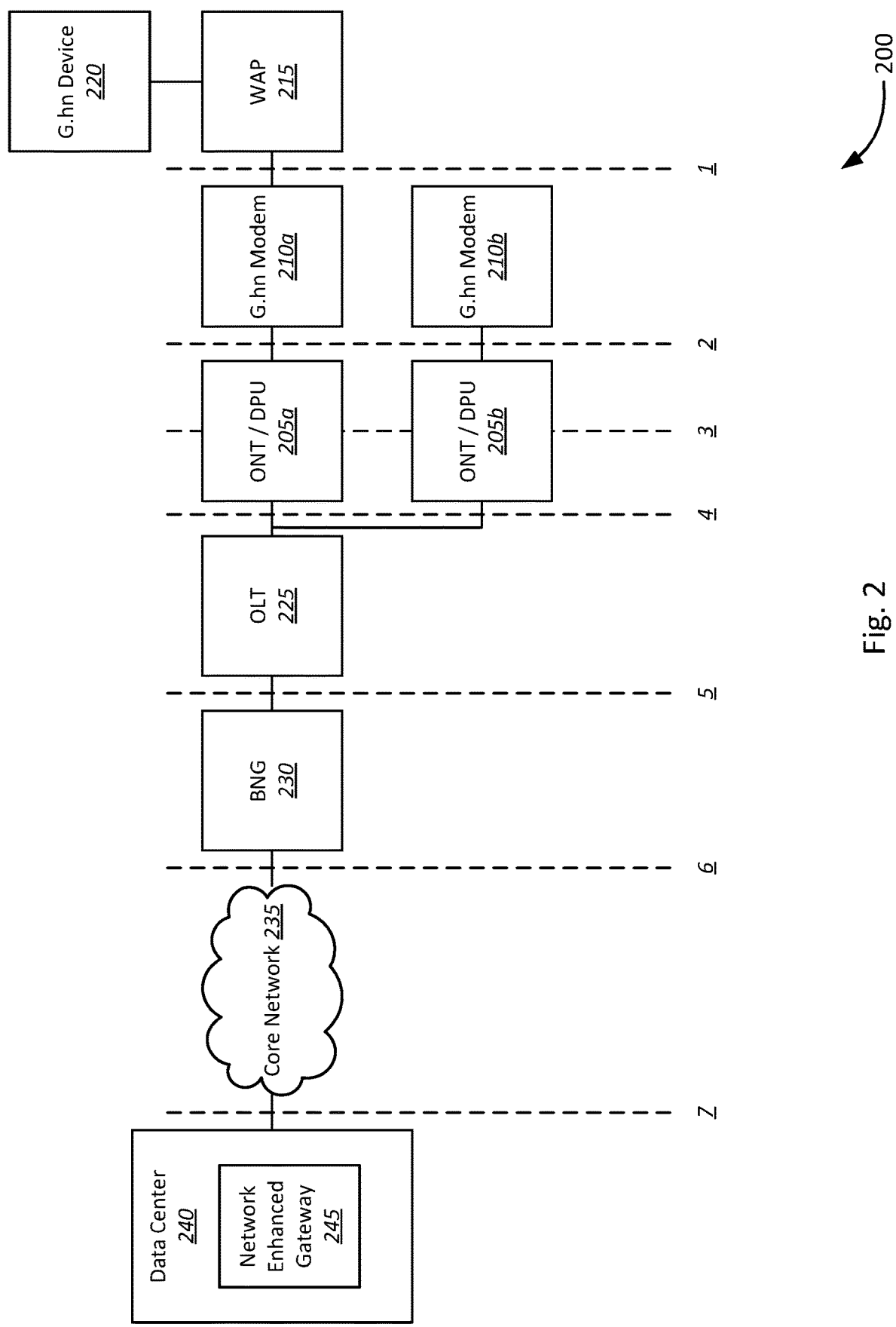
FIG. 2 is a schematic block diagram of network segments in an example architecture, in accordance with various embodiments.

FIG. 2 is a schematic block diagram of various network segments in an example architecture, in accordance with various embodiments. The system 200 includes a first optical network terminal (ONT)/DPU 205a, second ONT/DPU 205b, first G.hn modem 210a, second G.hn modem 210b, wireless access point (WAP) 215, G.hn device 220, OLT 225, BNG 230, core network 235, data center 240, and network enhanced gateway 260. It should be noted that the various components of the system 200 are schematically illustrated in FIG. 2, and that modifications to the system 200 may be possible in accordance with various embodiments.

In various embodiments, the first ONT/DPU 205a may be coupled to the first G.hn modem 210a, and the second ONT/DPU 205b may be coupled to the second G.hn modem 210b. The first G.hn modem 210a may be coupled to the WAP 215, which may in turn be coupled to the G.hn device 220. On an upstream side, each of the first and second ONT/DPUs 205a, 205b may be coupled to the OLT 225. The OLT 225 may, in turn, be coupled to the BNG 230. The BNG 230 may be coupled, via the core network 235 to a data center 240, which further includes the network enhanced gateway 260.

Each of the various network segments between various components of the communications network are numbered from segment 1 to segment 7. For example, the segment coupling the network enhanced gateway 260/CO 240 to the core network 235 is labeled segment 7. The segment from the core network 235 to the BNG 230 is labeled segment 6. The segment from the BNG 230 to the OLT 225 is labeled segment 5, and the from OLT 225 to respective ONT/DPUs 205a, 205b labeled segment 4. Segment 3 refers to a segment and/or the interface between an ONT to copper wire infrastructure of the DPU of the ONT/DPU 205a, 205b. The segment between the DPU and respective G.hn modems 210a, 210b is labeled segment 2. According to various embodiments, the G.now to G.hn bridge device of FIG. 1 may be incorporated within or located at any point between the DPU and the G.hn Modem 210b. Data between the G.now to G.hn bridge to the G.hn modem 210b may be transmitted over segment 2. The segment from the G.hn modem 210a to the WAP 215 is labeled segment 1.

Each of the segments 1-7 may be implemented in a suitable communication medium. From example, segment 1 may include suitable copper wire, such as twisted pair (Cat 1, Cat 3, Cat 5, Cat 5e, Cat 6), coaxial cable, or powerline, or optical fiber. For example, in some embodiments, segment 1 may include suitable gigabit Ethernet cabling (e.g., Cat 5, Cat 5e, Cat 6). Segment 2 covers existing infrastructure and corresponding communication media. For example, in some embodiments, the DPU may be coupled to existing POTS and/or xDSL infrastructure, suitable to carry G.hn communications. Accordingly, in some embodiments, segment 2 may be implemented in cat 3. Segment 4, in some embodiments, may provide backhaul to an XG-PON network, and accordingly be implemented in suitable optical fiber. Similarly, the backhaul connection of segments 5-7, from the OLT 225 to the data center 240 may each be respective 10-gigabit Ethernet (10 GE) backhaul connections, which may be implemented in suitable fiber optic cables.

FIG. 3 is a schematic block diagram of a data plane model 300 along the network segments of the example architecture depicted in FIG. 2. The model 300 illustrates an example data frame as it traverses the various network segments. For example, the data plane model 300 depicts an ethernet frame at each of segments 1-7. It is to be noted that the data plane model 300 excludes destination information is excluded for purposes of clarity and to simplify descriptions of the various embodiments. Similarly, descriptions are provided in the context of upstream communication for purposes of clarity and to simplify the described examples. As will be appreciated by one of ordinary skill in the art, downstream operation may include corresponding destination information in each frame, and downstream routing functionality as applicable.

With reference to FIGS. 2 & 3, data generated by a client device 220 and transmitted across segment 1 to a G.hn modem 210a may include a source device media access control (MAC) address (SMAC$_1$) 325g, a source device IP address assigned by the network enhanced gateway 245 (SIP$_1$) 315g, and payload data 310g. The G.hn modem 210a, 210b may add a source G.hn device identifier in G.hn header 370 to the rest of the payload data. Accordingly, the frame, at segment 2, may include G.hn header 370, SMAC$_1$ 325f, SIP$_1$ 315f, and payload data 310f.

In various embodiments, once the DPU of a respective ONT/DPU 205a, 205b receives respective data from the G.hn modem 210a, 210b, the DPU may further be configured to decapsulate the frame and encapsulate each of SMAC$_1$ 325e, a per-port VLAN tag (VLAN$_1$) 320e added by the DPU, SIP$_1$ 315e, and payload data 310e as encapsulated payload 305e. Accordingly, the DPU may be configured to assign a VLAN tag, VLAN$_1$ 320e, identifying individual customer VLANs coupled to a given DPU. The DPU may further be configured to add to the Ethernet frame a generic routing encapsulation (GRE) packet header, GRE 330e, GRE tunnel source IP assigned to the DPU SIP$_2$ 335e, and a DPU source MAC address SMAC$_2$ 350c. Accordingly, a frame at segment 3 may include SMAC$_2$ 350c, SIP$_2$ 335e, GRE 330e, and encapsulated payload 305e, which further includes SMAC$_1$ 325e, VLAN$_1$ 320e, SIP$_1$ 315e, and payload data 310e.

In various embodiments, the ONT of a respective ONT/DPU 205a, 205b may be configured to encapsulate the Ethernet frame, at segment 3, into a GPON encapsulation method (GEM) frame as known to those in the art. Accordingly, the ONT may be configured to push a GPON encapsulation method (GEM) header 365, and a customer VLAN tag (CTAG) 360b to the frame. Thus, in some examples, the CTAG 360b may identify a VLAN tag associated with a given DPU as opposed to a specific customer. Accordingly, the frame, at segment 4, may include GEM 365, SMAC$_2$ 350b, CTAG 360b, SIP$_2$ 335d, GRE 330d, and encapsulated payload 305d, which further includes SMAC$_1$ 325d, VLAN$_1$ 320d, SIP$_1$ 315d, and payload data 310d.

The OLT 225, in various embodiments, terminates the GPON transmission convergence (GTC) layer and is coupled to the BNG 230. Accordingly, the OLT 225 may add a service VLAN tag (STAG) 355 to the frame, the STAG 355 identifying the service VLAN of the service provider. In some examples, tagging with both a CTAG 360a and STAG 355 be referred to as a double tagged VLAN. In some embodiments, the STAG 355 may be translated from one or more of the CTAG 360b and/or GEM header 365. Accordingly, the frame at segment 5 may include SMAC$_2$ 350a, STAG 355, CTAG 360a, SIP$_2$ 335c, GRE 330c, and encapsulated payload 305c, which further includes SMAC$_1$ 325c, VLAN$_1$ 320c, SIP$_1$ 315c, and payload data 310c.

The BNG 230 may, in turn, push a BNG source MAC address (ETH$_{BNG}$) 350b, and layer 2 (L2) header 345. In various embodiments, the structure of the L2 header 345 may depend on the organization of the core network 235. For example, if the core network 235 uses multiprotocol label switching (MPLS), and MPLS header may be added by the BNG 230. If an VXLAN or VLAN configuration is utilized by the core network 235, appropriate VXLAN or VLAN header may be added by the BNG 230. Accordingly, the frame at segment 6 may include ETH$_{BNG}$ 350b, L2 header 345, SIP$_2$ 335b, GRE 330b, and encapsulated payload 305b, which further includes SMAC$_1$ 325b, VLAN$_1$ 320b, SIP$_1$ 315b, and payload data 310b.

Depending on the organization of the core network 235, when the frame arrives at data center 240, and is received by the network enhanced gateway 245, as depicted at segment 7. Accordingly, the frame may include ETH$_X$ 340a, which is the last/most recent source MAC address that is on the frame when it arrives from the core network 235. The frame further includes SIP$_2$ 335a, GRE 330a, and encapsulated payload 305a, which further includes SMAC$_1$ 325a, VLAN$_1$ 320a, SIP$_1$ 315a, and payload data 310a. The network enhanced gateway 245 may, in turn, route the data as from the data center 240 to the appropriate service provider's cloud network and/or resources, and/or to the appropriate recipient. In this way, data is appropriately routed from and to the appropriate customer device on a respective customer VLAN, as assigned by the network enhanced gateway 245.

Figure 4A:
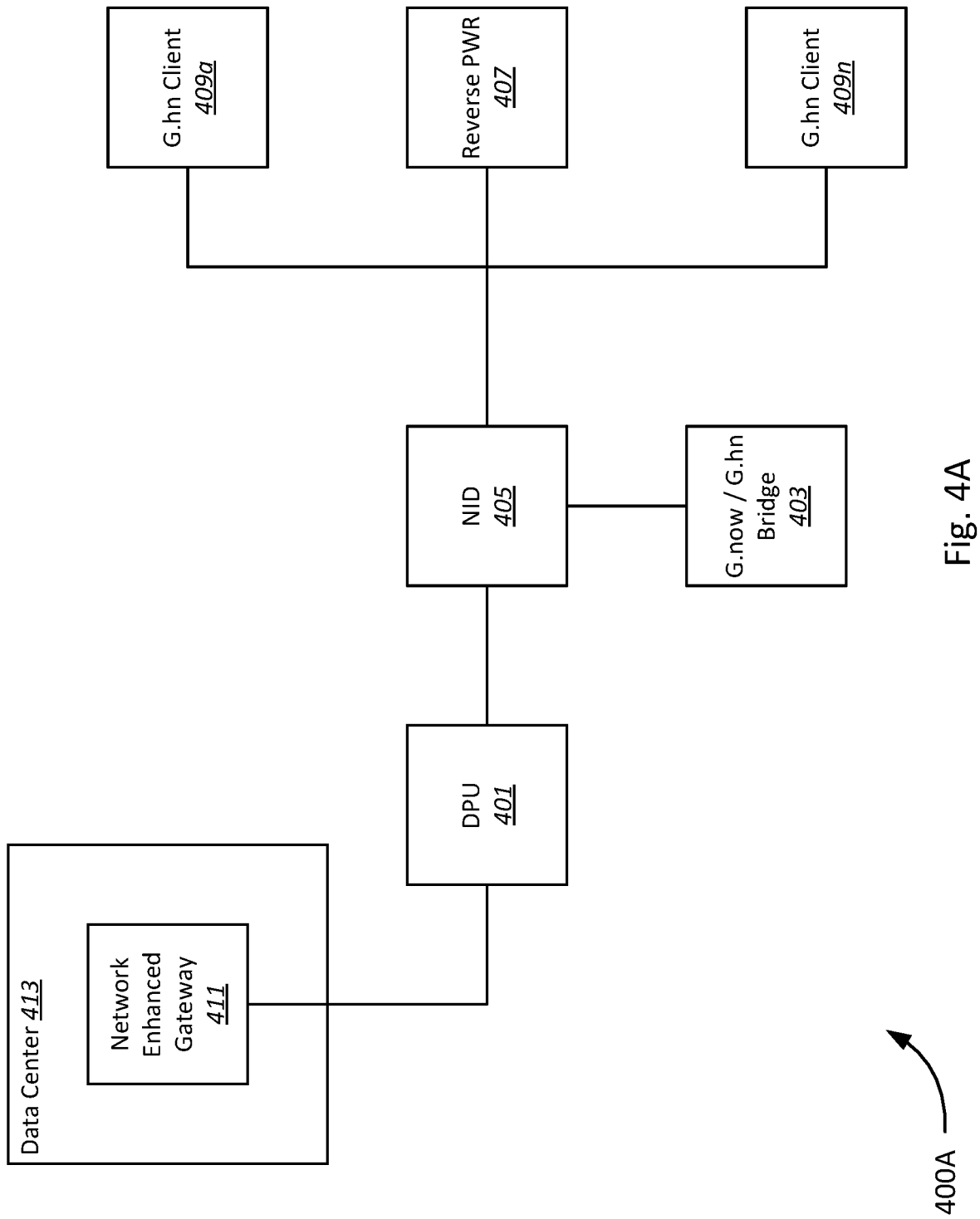
FIG. 4A is a schematic block diagram of a network access system, in accordance with various embodiments.

FIG. 4A is a schematic block diagram of a network access system 400A, in accordance with various embodiments. The network access system 400A may include a DPU 401, G.now/G.hn bridge 403, NID 405, reverse power device 407, one or more G.hn client devices 409a-409n (collectively "G.hn client devices 409"), network enhanced gateway 411, and data center 413. It should be noted that the various components of the system 400A are schematically illustrated in FIG. 4A, and that modifications to the system 400A may be possible in accordance with various embodiments.

In various embodiments, the DPU 401 may be coupled to the NID 405 on a downstream side, and the network enhanced gateway 411 in a data center 413 on the upstream side. The NID 405 may be coupled to the G.now/G.hn bridge 403, reverse power device 407, and one or more G.hn client devices 409a-409n.

In various embodiments, the network access system 400A may include various types of FTTdp access network architectures, between the DPU 401 and the network enhanced gateway 411, as known to those in the art. Accordingly, the DPU 401 may be coupled to existing fiber backhaul infrastructure. For example, the DPU 401 may be coupled to an existing POTS and/or xDSL pedestal, handhole, or cabinet. Thus, on the upstream side, the DPU 401 may be configured to be coupled to a fiber-optic access network via a backhaul optical fiber.

On the downstream side, the DPU 401 may be coupled to existing infrastructure. For example, in some embodiments, the DPU 401 may be configured to provide one or more respective copper wire drops to a respective customer premises. For example, the DPU 401 may be coupled to a service provider side of the NID 405 via existing cat 1 and/or cat 3 drop cables. For example, in some embodiments, the DPU 401 may be incorporated as part of existing and/or legacy copper wire infrastructure. The DPU 401, may, in some examples, interface with legacy plain old telephone service (POTS) and/or xDSL cabinets. Therefore, in some examples, connections from the DPU 401 may be terminated, at the respective G.now/G.hn bridge 403, via an RJ11 connector. In further embodiments, the DPU 401 may further be configured to receive a reverse power feed (RPF) from one or more customer premises via the G.now/G.hn bridge 403 and NID 405.

As will be described in greater detail with respect to FIG. 4B, in various embodiments, the service provider side of the NID 405 may be coupled to the G.now/G.hn bridge 403. The G.now/G.hn bridge 403 may, in some embodiments, include a G.now client in communication with a G.now master within the DPU 401. The G.now/G.hn bridge 403 may, accordingly, be configured to receive communications from the G.now master of the DPU 401 with the G.now client. Thus, in some embodiments, the G.now/G.hn bridge 403 may include a G.now client device in communication with the G.now master in a one-to-one arrangement.

The G.now/G.hn bridge 403 may further be configured to bridge communications from the G.now client to a G.hn master, which may be interfaced with the customer side of the NID 405. The G.hn master may, accordingly, be coupled to the G.hn client devices 409 of the customer premises in a one-to-many arrangement.

Accordingly, in various embodiments, the G.now/G.hn bridge 403 may be configured to bridge communications from a G.now connection (e.g., a Cat 1/Cat 3 connection) to existing infrastructure of the customer premises via the customer side of the NID 405 using G.hn. For example, the G.hn master of the G.now/G.hn bridge may be configured to couple to existing twisted pair (e.g., cat 3, cat 5, cat 5e, cat 6), or coaxial cable wiring of a customer premises, via the customer side of the NID 405 to the one or more G.hn client device 409a-409n. In some further embodiments, the G.now/G.hn bridge 403 may be configured to couple to an optical fiber or powerline of a customer premises.

The G.now/G.hn bridge 403 may further be configured to a receive an RPF from the customer premises, via the NID 405. The G.now/G.hn bridge 403 may further include a power cross connect to feed the reverse power signal to the DPU 401 and also to provide to the reverse power signal to a bridge power supply.

In various embodiments, the G.now/G.hn bridge 403 may be configured to mitigate crosstalk from other twisted pairs in the same binder. For example, as known to those in the art, the G.now/G.hn bridge 403 may include, for example, a bandpass filter. In further embodiments, the G.hn baseband processor of the G.now/G.hn bridge 403 may be configured to perform vectoring, or implement other crosstalk mitigation techniques as known to those in the art.

Figure 4B:
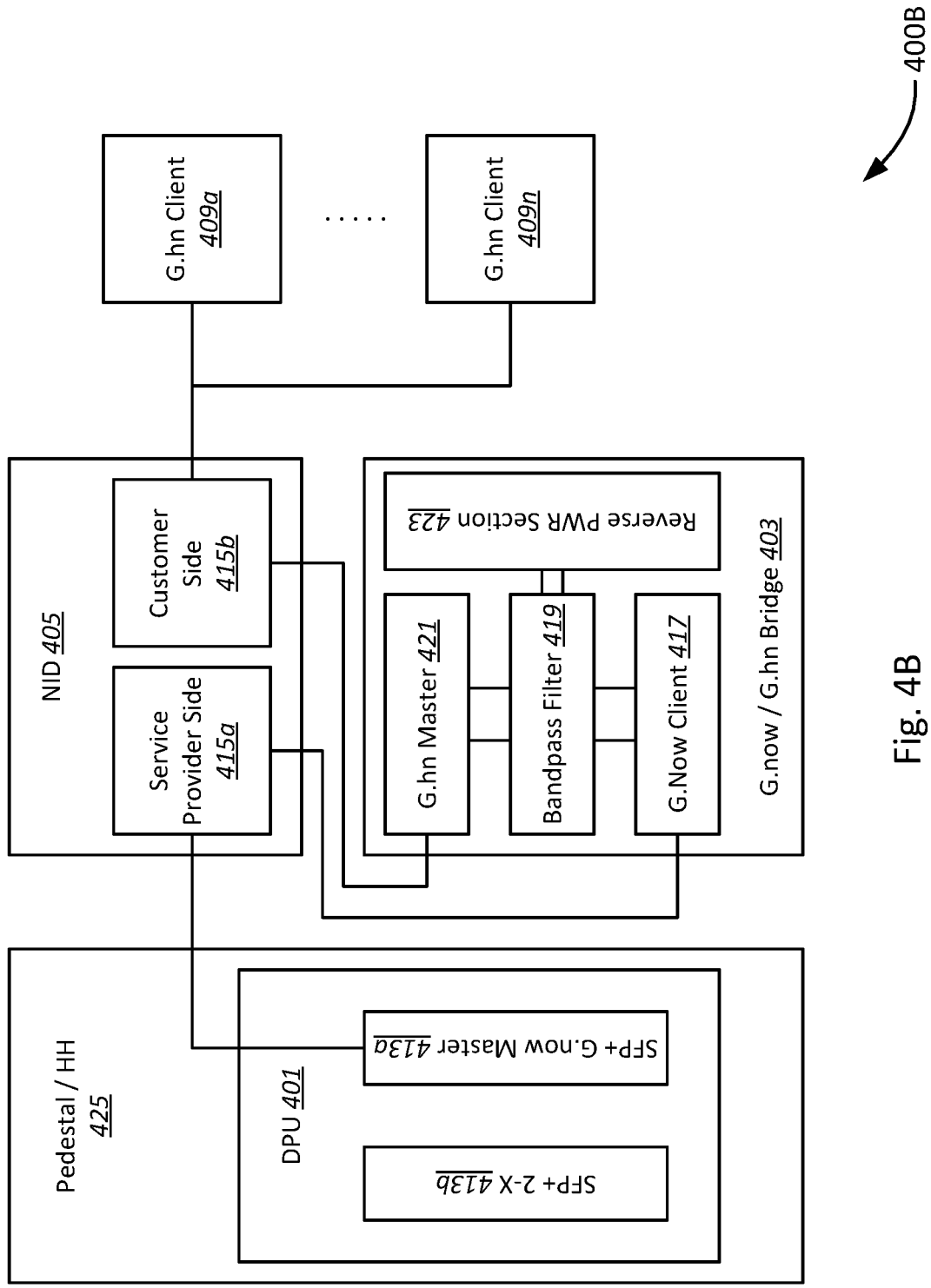
FIG. 4B is a schematic block diagram of a last mile deployment of the network access system, in accordance with various embodiments.

FIG. 4B is a schematic block diagram of a last mile deployment of the network access system 400B, in accordance with various embodiments. The network access system 400B may include a DPU 401 as part of a pedestal/handhole (HH) 425, the DPU 401 further including a first enhanced small form-factor pluggable (SFP+) transceiver 413a and additional SFP+ transceivers 2-X 413b. The system 400B may further include G.now/G.hn bridge 403. The G.now/G.hn bridge may further include G.now client 417, bandpass filter (BPF) 419, G.hn master 421, and reverse power section 423. The NID 405 may include a service provider side 415a terminal and customer side 415b terminal. The system may further include one or more G.hn clients 409a-409n.

In various embodiments, the DPU 401 may be coupled to the NID 405. Specifically, the first SFP+ transceiver 413a may be coupled to the service provider side terminal 415a of the NID 405. In various embodiments, the first SFP+ transceiver 413a may be a G.now master transceiver, or an SFP+ interface coupled to the G.now master of the DPU 401. As previously described, the DPU 401 may include a G.now master device. In some examples, the G.now master may include a G.hn baseband processor. Accordingly, in some embodiments, the first SFP+ transceiver 413a may be a physical transceiver, coupling communications from fiber optic to the G.hn baseband processor. In this way, the SFP+ transceivers 413a, including the one or more additional SFP+ transceivers 2-X 413b, may couple the DPU to a PON or other fiber access network. In yet further embodiments, as will be described below, one or more of the SFP+ transceivers 413a, 413b may couple the DPU 401 to another DPU in a cascading DPU arrangement. In various embodiments, the DPU 401 may be a 4 to 12 port G.now DPU.

In further embodiments, the G.hn baseband processor may, in turn, be configured to communicate over existing cat 1/cat 3 twisted pair cable via an appropriate PHY transceiver. Thus, in some embodiments, the first SFP+ transceiver 413a may be coupled to an appropriate terminal to interface with an existing copper drop wire. For example, in some embodiments, the first SFP+ transceiver 413a may be jumpered to an appropriate contact, via which the first SFP+ transceiver may be coupled to the appropriate copper twisted pair leading to the service provider side terminal 415a.

The service provider side terminal 415a of the NID 405 may further be coupled to the G.now client 417 of the G.now/G.hn bridge 403. In various embodiments, the G.now client 417 may be coupled to a G.hn master 421. In some embodiments, the BPF 419 may be configured to filter crosstalk from other lines, as well as to separate the reverse power signal from data on common lines. Accordingly, the BPF 419 may further be coupled to the reverse power section 423. The reverse power section 423 may further include reverse power devices such as a power over ethernet (PoE) switch and/or PoE injector. In various embodiments, the reverse power section 423 may include both a bridge power supply for the G.now/G.hn bridge 403, and further be configured to direct the RPF back to the DPU.

The G.hn master 421 may be coupled to the customer side 415 terminal of the NID 405. Accordingly, the G.hn master 421 may include a G.hn baseband processor configured to support communications of one or more G.hn clients 409a-409n. For example, in some embodiments, the G.hn master 421 may be a G.hn switch and/or adapter configured to support communications of multiple G.hn client devices 409.

Figure 4C:
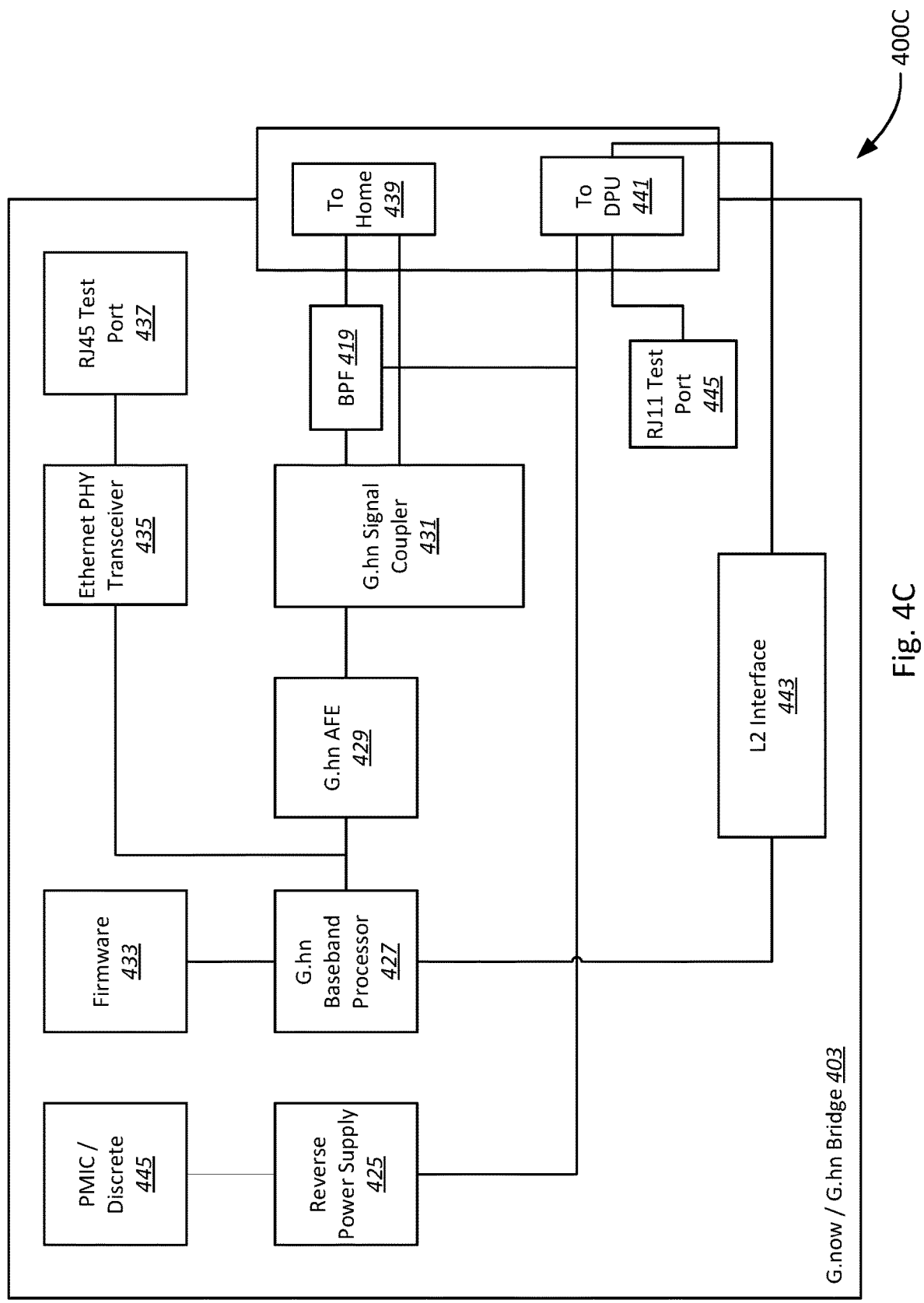
FIG. 4C is a schematic block diagram of a G.now to G.hn bridge in an external configuration, in accordance with various embodiments.

FIG. 4C is a schematic block diagram of a G.now/G.hn bridge 403 in an external configuration 400C, in accordance with various embodiments. The G.now/G.hn bridge 403 may include a reverse power bridge power supply 425, G.hn baseband processor 427, G.hn analog front end (AFE) 429, G.hn signal coupler 431, firmware 433, Ethernet PHY transceiver 435, RJ45 test port 437, BPF 419, home facing wiring terminal 439, DPU facing wiring terminal 441, L2 interface 443, RJ11 test port 445, and power management integrated circuit (PMIC)/discrete power IC 445. It should be noted that the various components of the external configuration 400C of the G.now/G.hn bridge 403 are schematically illustrated in FIG. 4C, and that modifications to the external configuration 400C may be possible in accordance with various embodiments.

The G.hn baseband processor 427 may be coupled to the G.hn AFE 429, which in turn is coupled to the G.hn signal coupler 431. The G.hn signal coupler 431 may be coupled, via a first pair, to a BPF 419, which is coupled to the home facing wiring terminal 439. Separately, a second pair may couple the G.hn signal coupler 431 directly to the home facing wiring terminal 439. Accordingly, in some embodiments, the first pair may be configured to carry upstream communications and the RPF from a customer premises. Similarly, the BPF 419 may further be coupled to the DPU facing wiring terminal 441, and a reverse power bridge power supply 425. Thus, in various embodiments, the RPF may be provided by the BPF 419 to both the DPU facing wiring terminal 441 and the reverse power bridge power supply 425. One or more pairs from the DPU facing wiring terminal 441 may be coupled to the G.hn baseband processor 427 via an L2 interface 445. Furthermore, an RJ11 test port 445 may be coupled to the DPU facing wiring terminal 441.

In various embodiments, the G.hn baseband processor 427 may be further be coupled to firmware 433 stored, for example, in solid state and/or flash memory. The G.hn baseband processor 427 may further be coupled to an ethernet PHY transceiver 435, further coupled to an RJ45 test port 437. The reverse power bridge power supply 425 may further be coupled to the PMIC/discrete power supply 445.

Accordingly, in various embodiments, the G.now/G.hn bridge 403 may be configured as a G.now client, further configured to receive communications from a G.now master (e.g., at the DPU), and further to bridge communications to a subscriber's (e.g., customer) network. The G.now/G.hn bridge 403 may, accordingly, further be configured as a G.hn master in communication with one or more G.hn client devices of the customer network.

In various embodiments, the G.now/G.hn bridge 403 may be coupled to a DPU via the DPU facing wiring terminal 441. Thus, the DPU facing wiring terminal 441 may be coupled to a service provider side terminal 415a of the NID 405. The DPU facing wiring terminal 441 may be coupled to the G.hn baseband processor 427 via an L2 interface 443. In some embodiments, the DPU facing wiring terminal 441 may be coupled to an L2 interface 443 via an RJ11 jumper. According to various embodiments, the L2 interface 443 may include, without limitation, an SFP+ transceiver and cage for G.hn or Ethernet communications. In various embodiments, the SFP+ transceivers may be configured to support multiple types of L2 interfaces 443, such as, without limitation, G.hn, G.now, Ethernet, xDSL, xPON, etc. The L2 interface 443 may, in turn, be coupled to the G.hn baseband processor 427. In some embodiments, the L2 interface 443 may be coupled to the G.hn baseband processor 427, for example, via a serial gigabit media-independent interface (SGMII). Accordingly, the G.hn baseband processor 427 may be configured to both receive and transmit data to the DPU via the L2 interface 443.

In various embodiments, the G.now/G.hn bridge 403 may further be coupled to a customer premises, and more specifically, one or more G.hn client devices via the home facing wiring terminal 439. For example, in some embodiments, the home facing wiring terminal 439 may be coupled to a customer side terminal 415b of the NID 405. The home facing wiring terminal 439 may be coupled to a G.hn signal coupler 431 and BPF 419. The G.hn signal coupler 431 may be configured to couple the G.hn AFE 429 to the home facing wiring terminal 439, via which data may be transmitted and/or received from existing customer premises wiring, (e.g., cat 3, cat 5, cat 5e, cat 6, coaxial cable, etc.). The G.hn signal coupler 431 may include, for example, suitable physical transceivers, line drivers, amplifiers, power divider, directional couplers, and the like, as known to those in the art and as applicable to respective customer premises wiring. The G.hn baseband processor 427 may further be coupled to an ethernet PHY transceiver 435, which may further be coupled to an RJ45 test port 437.

The G.hn baseband processor 427 may, accordingly, be configured to communicate with one or more G.hn client devices 409a-409n of the customer premises via the appropriate customer side wiring terminal 415b of the NID 405. In some embodiments, the G.hn signal coupler 431 may be configured to receive both downstream and upstream communications. In some examples, the G.now/G.hn bridge 403 may be configured to filter upstream communications via the BPF 419. IN some embodiments, the BPF 419 may, accordingly, be configured to separately filter RPF signal from data communications. Thus, the BPF 419 may be configured to receive RPF via appropriate home facing wiring terminal 439, and to provide the RPF to the reverse power bridge power supply 425, and further to the DPU via the appropriate DPU facing wiring terminal 441. The BPF 419 may further be configured to allow data from the customer premises to passed via the G.hn coupler 431 to the G.hn baseband processor 427. Similarly, downstream communications from the DPU may be received by the G.hn baseband processor 427 via the L2 interface 443, and passed to the G.hn AFE 429, which may further be provided to the G.hn signal coupler 431 to the appropriate terminals of the home facing wiring terminal 439.

In various embodiments, the RJ45 test port 437 may be configured to allow validation of interior G.hn client devices, such as G.hn clients 409, from the G.now/G.hn bridge 403. Moreover, the G.now link between the DPU 401 and G.now/G.hn bridge 403 may be also be validated via the RJ45 test port 437 using tools known to those skilled in the art. Similarly, in various embodiments, the RJ11 test port 445 may be configured to validate the G.now connection to the DPU 401, and in some embodiments, to provide reverse power to the DPU 401.

In various embodiments, the reverse power bridge power supply 425 and PMIC/discrete power supply 445 may comprise part of the reverse power section 423 of the G.now/G.hn bridge 403. The reverse power section 423 may, accordingly, include, without limitation, a PoE device power supply ICs, PoE injector, PoE midspan, and/or any other suitable components for power management and control. In some embodiments, the reverse power bridge power supply 425 may further be coupled to the PMIC/discrete power supply 445. Accordingly, in some embodiments, the PMIC/discrete power supply 445 may be configured to power to the various components of the G.now/G.hn bridge 403, and in some examples to perform power management functions for the G.now/G.hn bridge 403.

Figure 4D:
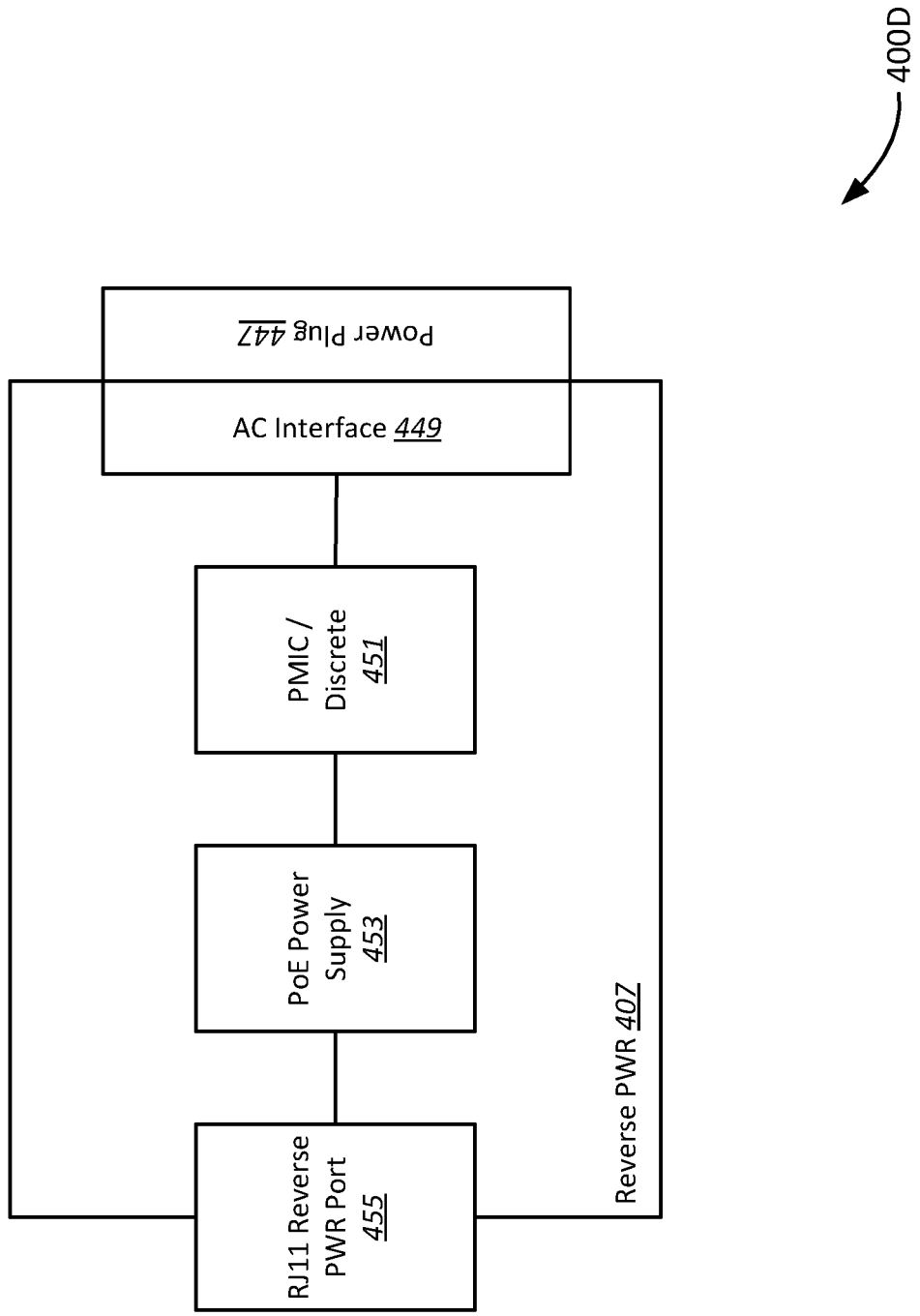
FIG. 4D is a schematic block diagram of a reverse power device, in accordance with various embodiments.

FIG. 4D is a schematic block diagram of an interior configuration 400D of a reverse power device 407, in accordance with various embodiments. In various embodiments, the reverse power device 400D includes a power plug 447, alternating current (AC) interface 449, PMIC/discrete power supply 451, PoE power supply 453, and RJ11 reverse power port 455. It should be noted that the various components of the interior configuration 400D of the G.now/G.hn bridge 403 are schematically illustrated in FIG. 4D, and that modifications to the interior configuration 400D of the reverse power device 407 may be possible in accordance with various embodiments.

In various embodiments, the reverse power device 407 may be configured to be coupled to the power circuit of a customer premises via the power plug 447. For example, the reverse power device 407 may be coupled to a wall power/power outlet via the power plug 447. The power plug 447 may further be coupled to an AC interface 449. The AC interface 449 may be configured to interface the AC signal from wall power to the PMIC/discrete power supply 451. The PMIC/discrete power supply 451 may include one or more of the PMIC and/or a discrete power supply. In various embodiments, the PMIC/discrete power supply 451 may be configured to convert the AC wall power signal to DC power. The PMIC/discrete power supply 451 may be further be configured to perform power management functions as known to those in the art. The PMIC/discrete power supply 451 may, in turn, be coupled to a PoE power supply 453. The PoE power supply 453 may, accordingly, be configured to receive a DC and/or alternatively an AC power signal and to convert it into a PoE signal. Accordingly, the PoE power supply 453 may, in some examples, be coupled to an RJ11 reverse power port 455. The reverse power device 407 may, accordingly, be configured to be coupled to existing twisted pair wiring of the customer premises via the RJ11 reverse power port 455. In other embodiments, different reverse power ports may be utilized, such as an RJ45 reverse power port. Thus, in various embodiments, the reverse power device 407 may be configured to provide the RPF the G.now/G.hn bridge 403 and/or DPU 401 from the customer premises.

Figure 4E:
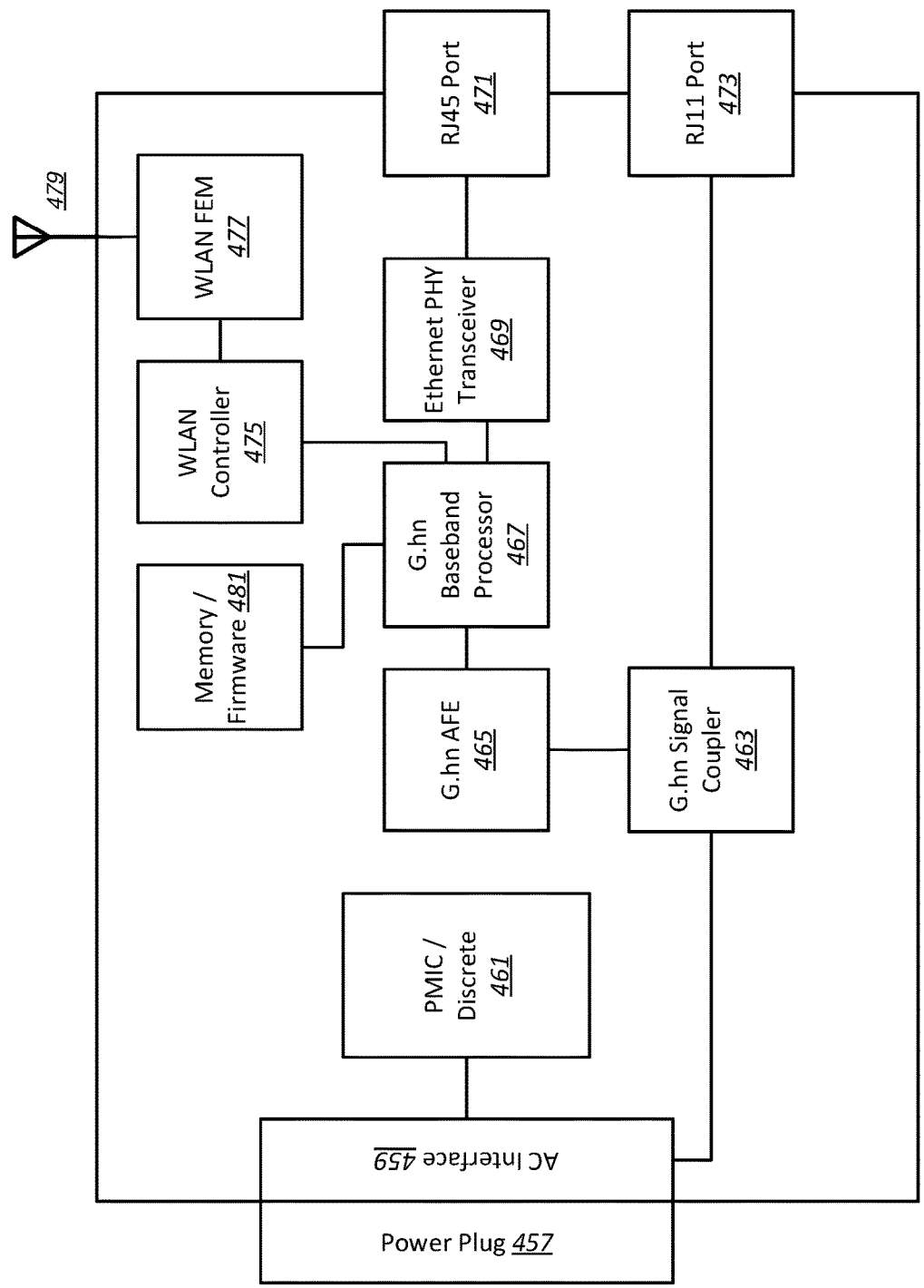
FIG. 4E is a schematic block diagram of a G.hn client device, in accordance with various embodiments.

FIG. 4E is a schematic block diagram of a G.hn client device 400E, in accordance with various embodiments. In various embodiments, the G.hn client device 400E may be one example configuration of the G.hn client device 409a-409n. The G.hn client device 400E includes a power plug 457, AC interface 459, PMIC/discrete power supply 461, G.hn signal coupler 463, G.hn AFE 465, G.hn baseband processor 467, Ethernet PHY transceiver 469, RJ45 port 471, RJ11 port 473, WLAN controller 475, WLAN front end module (FEM) 477, antenna 479, and memory/firmware 481. It should be noted that the various components of the external configuration 400C of the G.now/G.hn bridge 403 are schematically illustrated in FIG. 4E, and that modifications to the G.hn client device 400E may be possible in accordance with various embodiments.

In various embodiments, the G.hn client device 400E may be coupled to wall power/wall outlet of a customer premises via the power plug 457. The power plug 457 may be coupled to an AC interface 459, which in turn may be coupled to a PMIC/discrete power supply 461. The G.hn signal coupler 463 may be coupled to an RJ11 port 473, and in some embodiments, to the AC interface 459. The G.hn signal coupler 463 may further be coupled to the G.hn AFE 465. The G.hn AFE 465 may, in turn, be coupled to the G.hn baseband processor 467. In various embodiments, the G.hn baseband processor 467 may further be coupled to an Ethernet PHY transceiver 469, WLAN controller 475, and memory/firmware 481. The Ethernet PHY transceiver 469 may, in turn, be coupled to an RJ45 port 471, and the WLAN controller 475 may be coupled to a WLAN FEM 477, which is coupled to the antenna 479.

In various embodiments, the G.hn client device 400E may be configured to communicate with a G.hn master 421 of the G.now/G.hn bridge 403. In some embodiments, the G.hn client device 400E may be coupled to the G.hn master 421 via an RJ11 port 473. Accordingly, the RJ11 port 473 may be configured to accept an RJ11 connection, which may in turn be coupled to existing customer premises wiring (e.g., Cat 1, Cat 3, etc.). The signal from the RJ11 port 473 may be coupled to the G.hn baseband processor 467 via the G.hn signal coupler 463 and G.hn AFE 465.

In various embodiments, the G.hn baseband processor may be configured to interface with the Ethernet PHY transceiver 469 and WLAN controller 475. The G.hn baseband processor 467 may be configured to communicate with an end-user client device via the RJ45 port 471 and/or a wireless connection. Thus, in some examples, the G.hn baseband processor 467 may be configured to transmit and receive data from an end-user device over either a wired RJ45 connection and/or wireless connection. In some further embodiments, the G.hn baseband processor 467 may further be configured to communicate over power line via a PHY powerline transceiver. Thus, the G.hn baseband processor 467 may further be coupled to the AC interface 459 via a G.hn signal coupler 463, which may include a PHY powerline transceiver (not depicted). Thus, according to various embodiments, the G.hn client device 400E may be configured to support one or more end user devices via either wired and/or wireless connections, and to couple the one or more end user devices via a G.hn connection to the G.now/G.hn bridge 403, and further to an access network via the G.now connection to the DPU 401. In various embodiments, wired connections may include connections via twisted pair (cat 3, cat 5, cat 5e, cat 6, etc.), coaxial cable, or powerline. Accordingly, in some alternative arrangements, the G.hn client device 400E may further include a coaxial transceiver (not depicted). Wireless connections supported by the WLAN controller 475 and/or WLAN FEM chipset 477 may include, without limitation, a wireless communication device and/or chipset (such as a Bluetooth™ device, an 802.11 device, a WiFi device, a WiMax device, a WWAN device, a Z-Wave device, a ZigBee device, cellular communication facilities, etc.), and/or a LP wireless device. Accordingly, the WLAN controller 475 and/or WLAN FEM 477 may be configured to create, manage, and/or support a wireless network, including, without limitation, a network operating under any of the IEEE 802.11x suite of protocols, the Bluetooth™ protocol known in the art, and/or any other wireless protocol; and/or any combination of these and/or other networks.

Figure 5A:
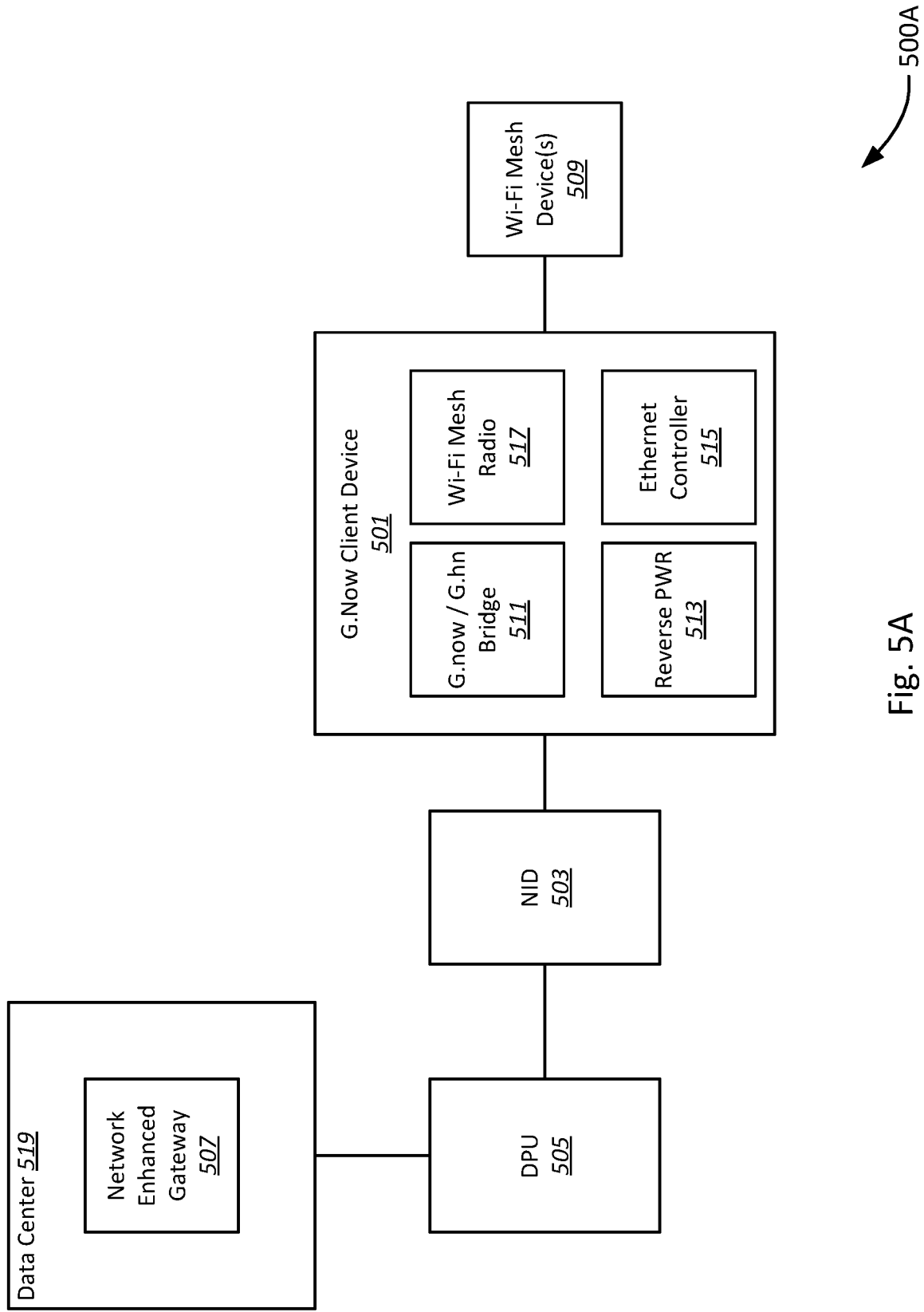
FIG. 5A is a schematic block diagram of an alternative arrangement for a network access system, in accordance with various embodiments.

FIG. 5A is a schematic block diagram of an alternative arrangement for a network access system 500A, in accordance with various embodiments. The network access system 500A may include a G.now client device 501, NID 503, DPU 505, network enhanced gateway 507, one or more Wi-Fi mesh devices 509, bridge 511, reverse power device 513, Ethernet controller 515, Wi-Fi mesh radio 517, and data center 519. It should be noted that the various components of the system 500A are schematically illustrated in FIG. 5A, and that modifications to the system 500A may be possible in accordance with various embodiments.

In contrast with the network access system 400A of FIG. 4A, the network access system 500A employs a G.now client device 501 located within a customer premises and coupled to the DPU 505 via the NID 503. The G.now client device 501 may include a G.now/G.hn bridge 511 configured to bridge communications from the G.now connection with the DPU 505 to a G.hn connection of the customer premises. Accordingly, in various embodiments, the G.now client device 501 may be coupled to the customer side terminal of an NID 503. The NID 503 may be coupled, on a service provider side terminal, to the DPU 505. The DPU 505 may, in turn, be coupled to a network enhanced gateway 507 of a data center 519. The G.now client device 501 may further include a reverse power section 513, Ethernet controller 515, and Wi-Fi mesh radio 517. The G.now client device 501 may, accordingly, be coupled to one or more Wi-Fi mesh devices 509.

In various embodiments, the DPU 505 may be coupled to the NID 503 on a downstream side, and the network enhanced gateway 507 of the data center 519 on the upstream side. On the downstream side, the DPU 505 may be coupled to the G.now/G.hn bridge 511 of the of the G.now client device 501. The G.now client device 501, accordingly, may be configured to be coupled to the DPU 505 via a G.now connection. For example, in some embodiments, the G.now client device 501 may be coupled to existing copper wire infrastructure of the home, such as cat 1/cat 3 twisted pair. In some embodiments, the G.now client device 501 may, in turn, provide a wireless and/or wired interface for a G.hn connection over which one or more Wi-Fi mesh devices 509 may be coupled to the G.now client device 501.

In some embodiments, the NID 503 may further be configured to allow external testing of the G.now device and/or Wi-Fi mesh devices 509 from the exterior of the home. For example, in some embodiments, a test cable at the NID 503 coupled to the G.now client device 501. Alternatively, the DPU 505 may be configured to provide testing ports and/or configured to allow remote management of customer premises equipment (CPE), including the G.now client device 501, such as through remote testing protocols as set forth in technical report 069 (TR-069), as known to those in the art.

Accordingly, in various embodiments, the network access system 500A may include various types of FTTdp access network architectures, between the DPU 505 and the network enhanced gateway 507. Accordingly, the DPU 505 may be coupled to existing fiber backhaul infrastructure on an upstream side, and to existing copper wire infrastructure on the downstream side. For example, the DPU 401 may be coupled to an existing POTS and/or xDSL pedestal, handhole, or cabinet coupled to a PON. Thus, on the upstream side, the DPU 505 may be configured to be coupled to a fiber-optic access network via a backhaul optical fiber, and coupled to the NID 503 via one or more copper wire drop cables (e.g., cat 1, cat 3).

In further embodiments, the DPU 505 may be configured to receive an RPF from the G.now client device 501. Accordingly, as will be described in greater detail below, the reverse power section 513 of the G.now client device 501 may further be coupled to a reverse power power supply of the DPU 505 via the NID 503.

Figure 5B:
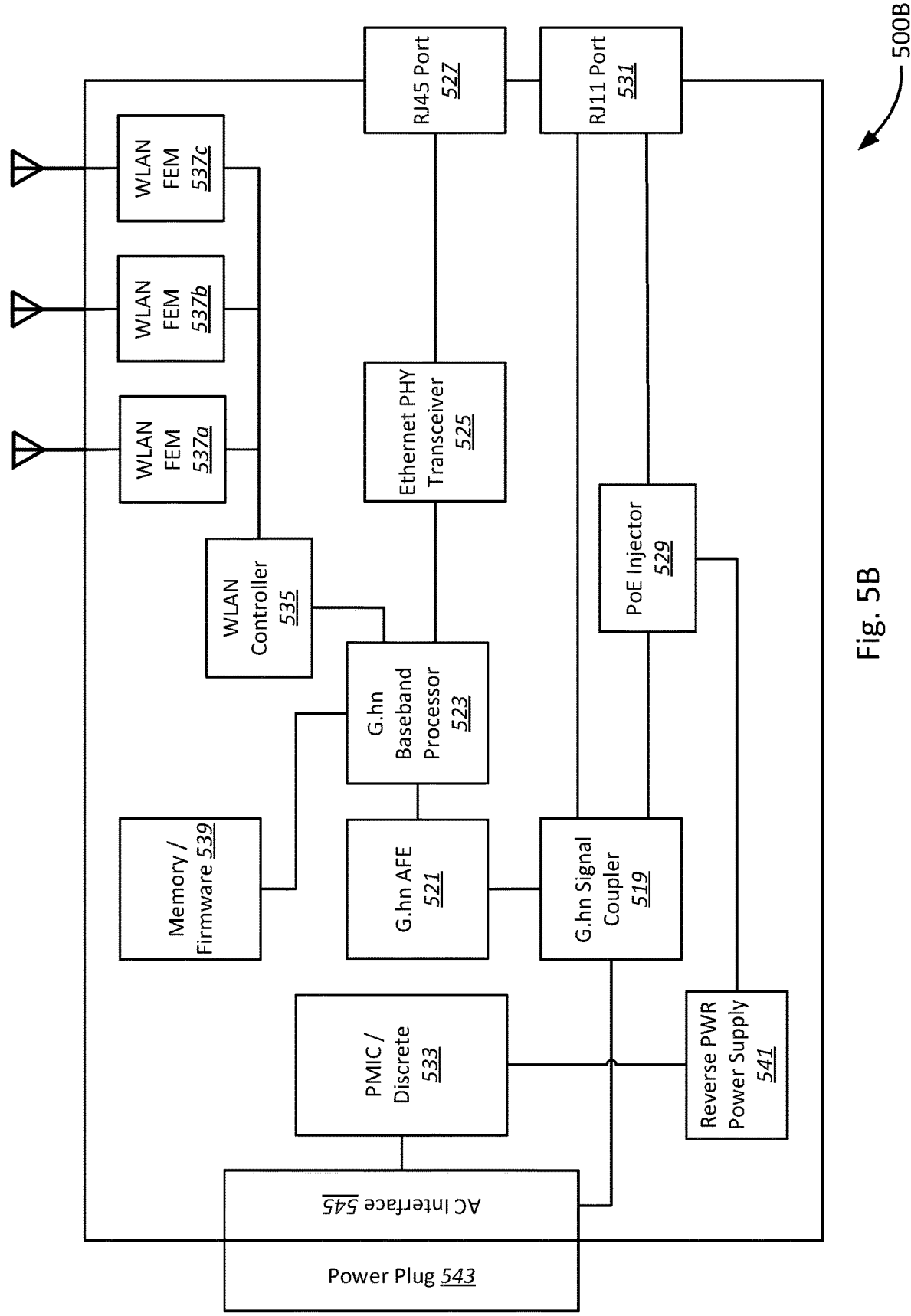
FIG. 5B is a schematic block diagram of a G.hn client device with an internal G.now to G.hn bridge and reverse power, in accordance with various embodiments.

FIG. 5B is a schematic block diagram of a G.hn client device 500B with an internal G.now to G.hn bridge and reverse power, in accordance with various embodiments. The G.now client device 500B includes G.hn signal coupler 519, G.hn AFE 521, G.hn baseband processor 523, Ethernet PHY transceiver 525, RJ45 port 527, PoE injector 529, RJ11 port 531, PMIC/discrete power supply 533, WLAN controller 535, a first WLAN FEM 537a, a second WLAN FEM 537b, third WLAN FEM 537c, memory/firmware 539, reverse power power supply 541, power plug 543, and AC interface 545. It should be noted that the various components of the G.now client device 500B are schematically illustrated in FIG. 5B, and that modifications to G.now client device 500B may be possible in accordance with various embodiments.

With reference to FIGS. 5A & 5B, in various embodiments, the G.now client device 500B may be coupled to the DPU 505 via the RJ11 port 531. The RJ11 port 531 may be coupled to the G.now/G.hn bridge section of the G.now client device 501, which may include, for example, the G.hn signal coupler 519, G.hn AFE 521, and G.hn baseband processor 523. The RJ11 port 531 may further be coupled to a PoE injector 529, which may in turn be coupled to the reverse power power supply 541, PMIC/discrete 533 power supply, power plug 543, and AC interface 545. The G.hn baseband processor 523 may, in turn, be coupled to an Ethernet PHY transceiver 525, configured to drive a signal provided via the RJ45 port 527, and WLAN controller 535, which may be configured to control WLAN FEMs 537a-537c. The G.hn baseband processor 523 may further be coupled to memory/firmware 539.

In various embodiments, the G.now client device 500B may be configured to communicate with a G.now master at the DPU 505 via the RJ11 port 531. Accordingly, in some embodiments, the RJ11 port 531 may be coupled to the NID 503 via a cat 1/cat 3 cable connection. Upstream communications received from the RJ11 port 531 may be received by the G.hn signal coupler 519, and downstream communications transmitted to the RJ11 port 531 via the G.hn signal coupler 519. Accordingly, as previously described, in various embodiments, the G.hn signal coupler 519 may include any suitable physical transceivers, line drivers, amplifiers, dividers, directional couplers, and the like, as known to those in the art and as applicable to respective customer premises wiring. The G.now signal coupler 519 may, accordingly, provide data received from the RJ11 port 531 to the G.hn AFE 521 for further processing by the G.hn baseband processor 523.

With the G.now client device 500B placed inside a customer premises, the G.now client device 500B may be configured to communicate with one or more G.hn client devices 509 and/or end user devices directly coupled to the G.now client device 500B. Thus, in some embodiments, G.hn baseband processor 523 may be configured to communicate with one or more G.hn client devices 509 and/or end user devices via a wired and/or wireless connection. For example, in some embodiments, the G.hn baseband processor 523 may be configured to establish a G.hn connection to a G.hn client device 509 or end user device via the RJ45 port 527. In some embodiments, the G.now client device 500B may include one or more additional RJ45 ports (not depicted).

In further embodiments, the G.hn baseband processor 523 may be configured to establish wireless connection via the WLAN controller 535 and WLAN FEMs 537a-537c. In some embodiments, for example, the first WLAN FEM 537a may be configured to provide a mesh wireless backhaul connection (e.g., a 5 GHz and/or 2.4 GHz wireless connection, a point-to-point wireless connection, etc.), the second WLAN 537b may be configured to provide a 5 GHz WLAN connection, and the third WLAN FEM 537c may be configured to provide a 2.4 GHz WLAN connection. Thus, in some examples, the G.now client device 500B may be coupled to one or more end-user devices via the RJ45 port 527, or via 5 GHz WLAN, and/or 2.4 GHz WLAN connections. In some further embodiments, one or more G.hn client devices 509 may be coupled to the G.now client device 500B via the RJ45 port 527, or a wireless backhaul connection. As will be described in greater detail below with respect to FIG. 5C, the G.hn client device 509 may itself be configured to communicate with one or more end-user devices, allowing the end-user devices to be coupled to the DPU 505, and through an access network to the network enhanced gateway 507.

In various embodiments, the memory/firmware 539 may include one or more instructions executable by the G.hn baseband processor 523 to perform functions described with respect to the various example embodiments.

In various embodiments, the G.now client device 500B may further include a reverse power section, which may include the PoE injector 529, reverse power power supply 541, PMIC/discrete power supply 533, power plug 543, and AC interface 545. In some embodiments, the PoE injector 529 may be configured to inject an RPF signal, from the reverse power power supply 541, into an upstream connection to the DPU 505. In various embodiments, the reverse power section of the G.now client device 500B may be configured to be coupled to the power circuit of a customer premises via the power plug 543. For example, the G.now client device 500B may be coupled to wall power/a power outlet via the power plug 543. The power plug 543 may further be coupled to an AC interface 545. The AC interface 545 may be configured to interface the AC signal from wall power to the PMIC/discrete power supply 533. The PMIC/discrete power supply 533 may include one or more of the PMIC and/or a discrete power supply. In various embodiments, the PMIC/discrete power supply 533 may be configured to convert the AC wall power signal to DC power. The PMIC/discrete power supply 533 may be further be configured to power the G.now client device 500B and further to perform power management functions as known to those in the art. The PMIC/discrete power supply 533 may, in turn, be coupled to the reverse power power supply 541.

The reverse power power supply 541 may include, for example, a PoE power supply ICs, PoE injector, PoE midspan, and/or any other suitable components for power management and/or control. The reverse power power supply 541, for example, may be configured to receive a DC and/or alternatively an AC power signal and to convert it into a PoE signal. In some embodiments, the PoE injector 529 may be configured to inject the PoE signal into the line signal from the G.hn signal coupler 519, and to feed the PoE signal to the RJ11 port 531. Accordingly, the PoE injector 529 may, in some examples, be coupled to an RJ11 reverse power port 531.

Figure 5C:
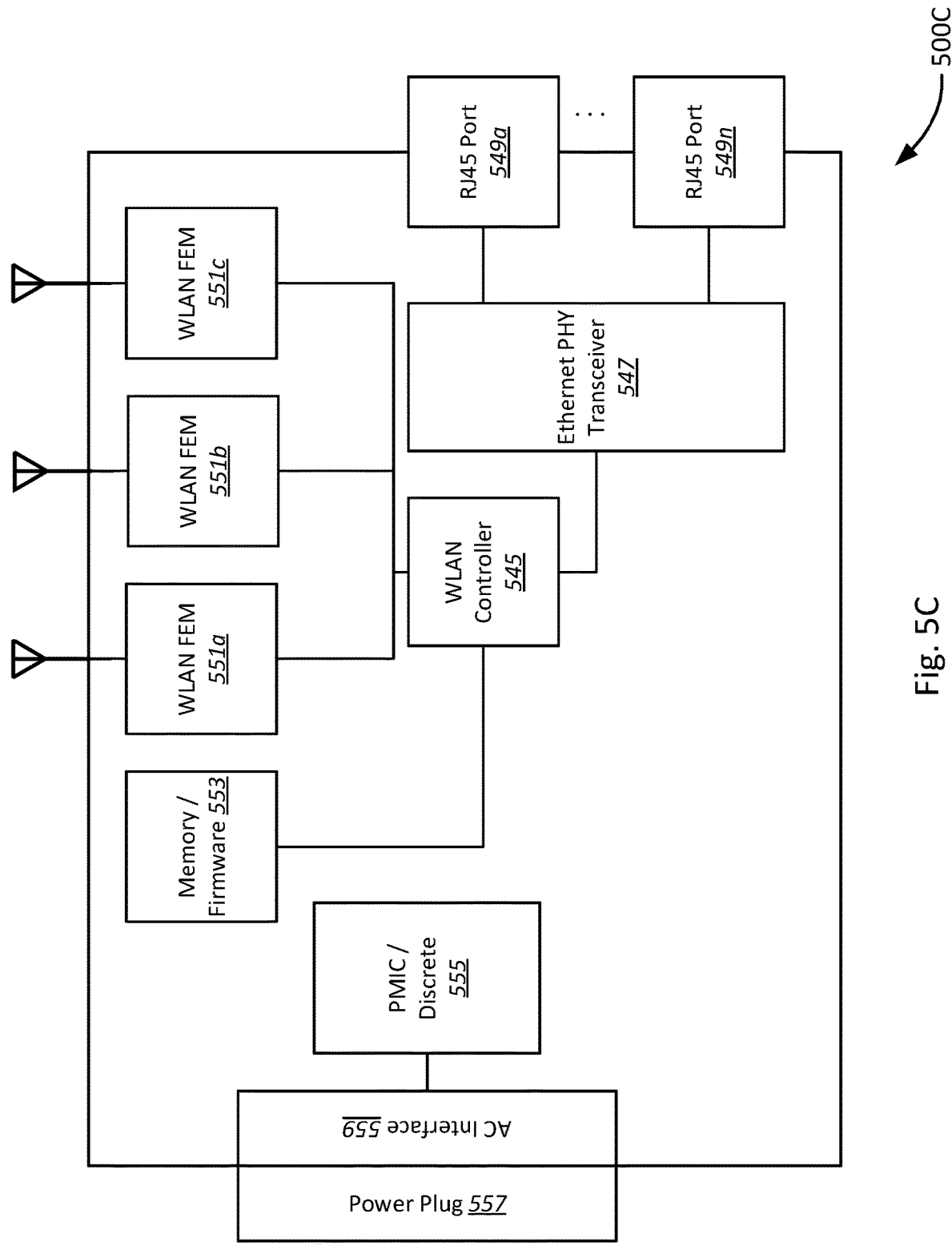
FIG. 5C is a schematic block diagram of a Wi-Fi mesh client device, in accordance with various embodiments.

FIG. 5C is a schematic block diagram of a Wi-Fi mesh client device 500C, in accordance with various embodiments. The Wi-Fi mesh client device 500C may include a WLAN controller 545, Ethernet PHY transceiver 547, one or more RJ45 ports 549a-549n, one or more WLAN FEMs 551a-551c, memory/firmware 553, PMIC/discrete power supply 555, power plug 557, and AC interface 559. It should be noted that the various components of the Wi-Fi mesh client device 500C are schematically illustrated in FIG. 5B, and that modifications to Wi-Fi mesh client device 500C may be possible in accordance with various embodiments.

With reference to FIGS. 5A-5C, in various embodiments, the Wi-Fi mesh client device 500C may be configured to be communicatively coupled to the G.now client device 500B. For example, in some embodiments, the Wi-Fi mesh client device 500C may be coupled to the G.now client device 500B via a wireless backhaul link. As previously described, the G.now client device 500B may include a mesh wireless backhaul radio (e.g., the first WLAN FEM 537a) configured to provide a mesh wireless backhaul connection (e.g., a 5 GHz and/or 2.4 GHz wireless connection, a point-to-point wireless connection, etc.) with the Wi-Fi mesh client device 500C. Accordingly, all upstream/backhaul traffic from the one or more Wi-Fi mesh devices 509 and any end-user devices may be carried over the mesh wireless backhaul connection to the G.now client device 500B. Accordingly, a first WLAN FEM 551a of the Wi-Fi mesh client device 500C may be configured to establish the mesh wireless backhaul connection to the G.now client device 500B.

In some embodiments, the WLAN controller 545 may further be coupled to an Ethernet PHY transceiver 547, and WLAN FEMs 551b-551c. Accordingly, the WLAN controller 545 may be configured to communicate with one or more end user devices via the one or more RJ45 ports 549a-549n. In further embodiments, the WLAN controller 545 may be configured to communicate with one or more end user devices via the WLAN FEMs 551b-551c. In some embodiments, the second WLAN FEM 551b may be configured to support a 5 GHz WLAN. Similarly, the third WLAN FEM 551c may be configured to support a 2.4 GHz WLAN. Accordingly, the Wi-Fi mesh client device 500C may employ WLAN FEMs 551a-551c to support a mesh wireless network, as known to those in the art.

Figure 6:
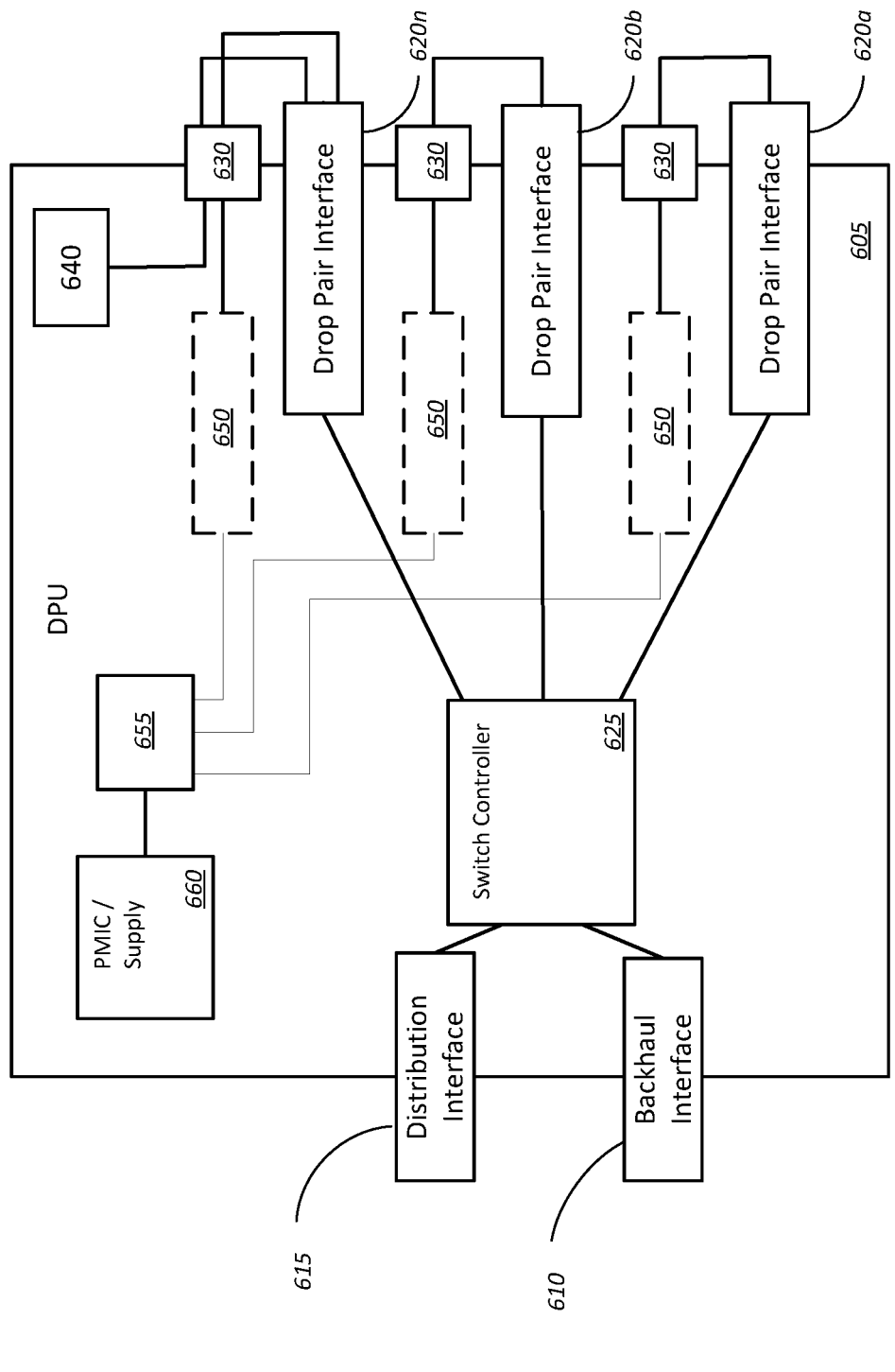
FIG. 6 is a schematic block diagram of a distribution point unit, in accordance with various embodiments.

FIG. 6 is a schematic block diagram of a distribution point unit, in accordance with various embodiments. FIG. 6 is a schematic block diagram of a system 600 comprising a distribution point unit ("DPU") 605, in accordance with various embodiments. The DPU 605 may include a backhaul interface 610, distribution interface 615, one or more drop pair interfaces 620a-620n, switch controller 625, screw terminals 630, POTS terminal 640, reverse power devices 650, power combiner 655, and PMIC/supply 660. It should be noted that the various components of the DPU 605 are schematically illustrated in FIG. 6, and that modifications to the DPU 605 may be possible in accordance with various embodiments.

In various embodiments, the switch controller 625 may be coupled on an upstream side to the backhaul interface 610. The switch controller 625 may further be coupled, on a downstream side, to a distribution interface and/or to the one or more drop pair interfaces 620a-620n. Each of the drop pair interfaces 620a-620n may further be coupled to, for example, a respective screw terminal 630. The screw terminals 630 may each include contacts for individual pairs. Accordingly, appropriate contacts of the screw terminals 630 may be coupled to respective reverse power devices 650, each of which are further coupled to the power combiner 655. The power combiner 655 may, int urn be coupled to the PMIC/supply 660. Appropriate contacts of the screw terminal 630 may further be configured to respective contacts of the POTS terminal 640.

In various embodiments, the DPU 605 might be configured to provide access to a service provider network, such as an access network, to one or more customer premises. Accordingly, the DPU 605 may enable communications from the access network (e.g., a fiber access network) to be carried over existing infrastructure to a customer premises. Thus, in some embodiments, one or more services from a service provider network may be provided to the one or more customer premises over existing copper wire infrastructure.

In some embodiments, the DPU 605 may be coupled to the access network via the backhaul interface. In other embodiments, the DPU 605 may be coupled to an upstream DPU via the backhaul interface. Accordingly, depending on the upstream connection, the backhaul interface 610 may include, without limitation, a G.hn SFP+ connector/cage, configured to accept a fiber optic backhaul cable and/or copper-based backhaul feed cable. Thus, the DPU 605 might be communicatively coupled to one or more service provider network(s) or to a second DPU via the G.hn SFP+ interface, which may further be configured to accept a G.hn connection (e.g., twisted pair/coaxial cable/fiber optic/etc.).

Similarly, on a downstream side, the distribution interface 615 may include an SFP+ connector configured to accept a fiber optic or twisted pair (e.g., cat 3, cat 5, cat 5e, cat 6, etc.) cable to a downstream DPU. The one or more drop pair interfaces 620a-620n may be configured to be coupled to the existing copper wire infrastructure via the respective screw terminals 630 and/or drop pair interface 620a-620n. For example, existing copper wire infrastructure may include, without limitation, cat 1, cat 3, cat 5, cat 5e, cat 6, coaxial cable, or other copper wire communication media as known to those in the art. Accordingly, a drop pair (or other cable) from a respective customer premises may be coupled to the appropriate drop pair interface 620a-620n. The drop pair interface, for example, may include a G.hn SFP+ connector/cage. The SFP+ cage, for example, may include RJ11, RJ45, or other suitable connection interface. Furthermore, in some embodiments, an RJ11/RJ45 jumper may be used to couple appropriate pairs from drop pair interface 620a-620n to a respective screw terminal 630.

The DPU 605 might additionally contain switch controller 625. Switch controller 625 might be configured to receive or transmit data associated with one or more services via the backhaul interface 610, distribution interface 615, and one or more drop pair interfaces 620a-620n as appropriate. For example, upstream data may be received from, and downstream data transmitted to an access network and/or one or more additional DPUs via the one or more backhaul interface 610. Similarly, downstream data may be received from, and upstream data transmitted to a subsequent DPU via the distribution interface 615. The switch controller 625 might further be configured to receive or transmit data with one or more customer premises via the drop pair interfaces 620a-620n.

In some further embodiments, the DPU 605 may additionally be configured to provide POTS service over fiber via the appropriate POTS terminal 640. Accordingly, the switch controller 625 may further be configured, in some examples, to process an analog voice signal received via a POTS line to the customer premises to provide POTS service to the customer premises.

The DPU 605 may further be configured to be reverse powered by one or more customer premises. A reverse power signal may be carried, from the customer premises, to the DPU 605 via one or more respective drop pairs. Accordingly, the drop pair interface 620a-620n may further be configured to receive a reverse power signal the Reverse power signal (e.g., RPF) may be coupled, from the drop pair interface to an appropriate contact of the respective screw terminal 630, which may in turn be provided to the reverse power device 650. The reverse power device 650 may include, without limitation, reverse power power supplies, injectors, midspans, etc., as known to those in the art. The RPF from one or more customer premises may then be combined, at the power combiner 655, which may provide a combined RPF signal to be used by the PMIC/supply 660 to power the DPU. Accordingly, the PMIC/Supply 660 may include, without limitation, a PMIC and/or discrete power supply, as known to those in the art.

Figure 7:
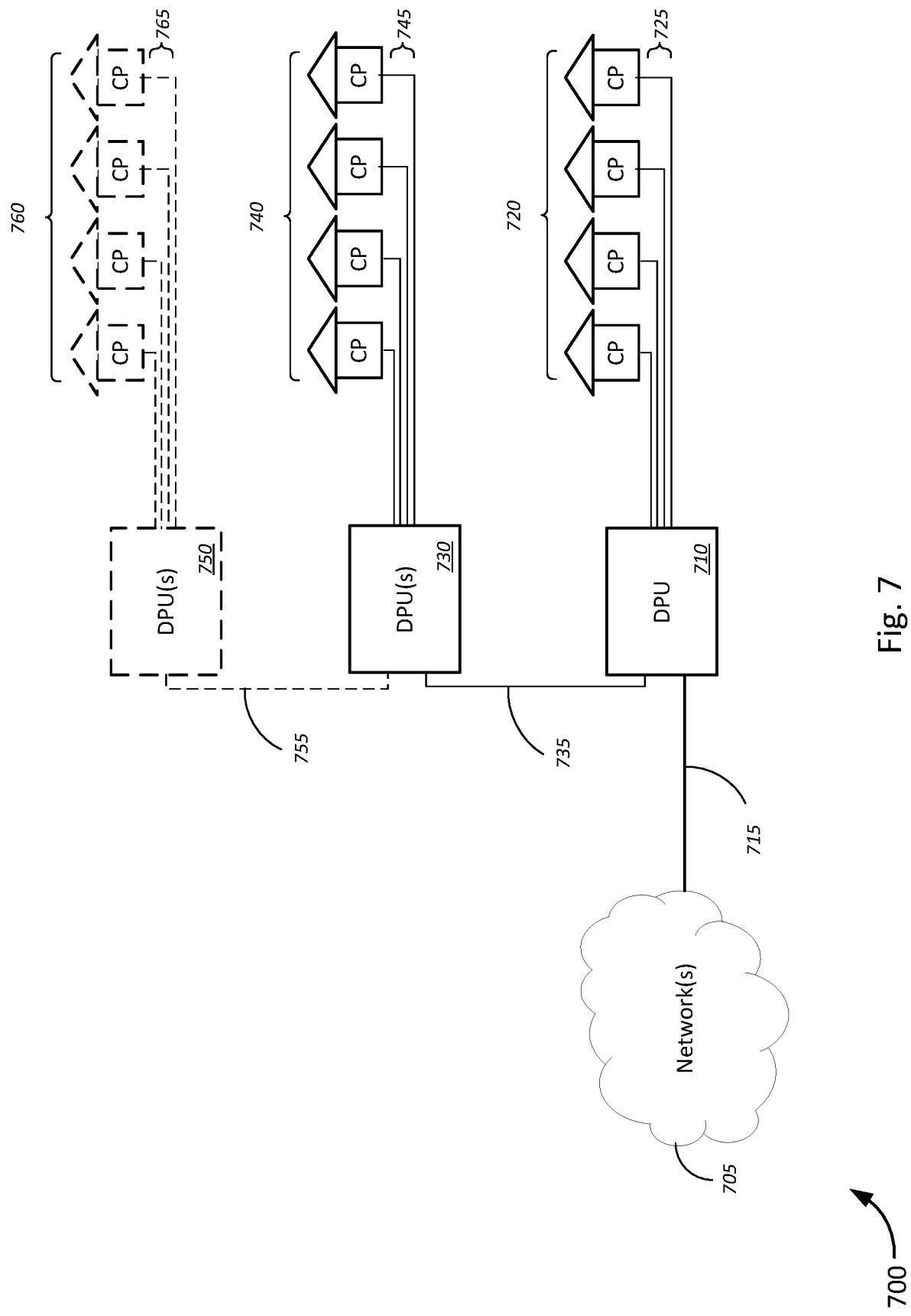
FIG. 7 is a schematic block diagram of a system for distributing one or more services to a customer premises via one or more distribution point units, in accordance with various embodiments.

FIG. 7 is a schematic block diagram of a system 700 for a cascaded network access architecture, over which one or more services from one or more service provider network(s) may be provided. The system 700 include a first DPU 710. The first DPU 710 may be communicatively coupled to an access network 705. As previously described, the access network 705 may include a PON, or other fiber access network. Accordingly, the first DPU 710 may be coupled to the service provider network 705 via one or more first lines 715. For example, the one or more first lines 715 may include a fiber optic access feed/backhaul connection, and/or an existing xDSL copper access feed line, for example, to an upstream DSLAM. Thus, the one or more first lines 715 may include, without limitation, one or more conductive signal lines such as one or more copper lines, or one or more optical fibers. The first DPU 710 may, accordingly, be configured to receive one or more network services from the one or more service provider via the access network 705 via the one or more first lines 715.

Accordingly, in various embodiments, the first DPU 710 of the cascaded arrangement may be coupled, via the backhaul connection, to the access network 705. One or more cascaded downstream DPUs 730, 750 may be coupled via respective backhaul lines 735, 755 to the first DPU 710. In various embodiments, the respective backhaul lines 735, 755 may be a copper-based backhaul based on G.now access schemes. Accordingly, the respective backhaul lines 735, 755 may include, without limitation, twisted pair and/or coaxial cable connections. In some embodiments, the same connection medium may be used as backhaul lines 735, 755, while in others, different types of connection mediums may be used as backhaul lines 735, 755 between the respective one or more downstream DPUs 730, 750. Although only two DPUs are depicted, it is to be understood that in other embodiments, multiple DPUs may be deployed. For example, in one embodiment, up to 10 DPUs may be deployed in a cascaded chain from the first DPU 710. In other words, in some examples, the first DPU 710 may be configured to provide backhaul connectivity for up to 10 DPUs. In other embodiments, more or less than 10 DPUs may be supported in a single cascaded chain of DPUs, depending, for example, on limitations of L2 bridging.

The system 700 may additionally include one or more first customer premises 720. The one or more first customer premises 720 may be communicatively coupled to the first DPU 710 via one or more first drop lines 725 (e.g., drop cables). The one or more first drop lines 725 may include, without limitation, one or more respective copper-wire drop lines to each of the one or more first customer premises 720. Thus, in some embodiments, the one or more first drop lines 725 may include existing copper wire infrastructure to the one or more first customer premises 720, such as twisted pair and/or coaxial cable wiring. The one or more first drop lines 725 may be configured to provide reverse power to the first DPU 710. In other words, the one or more first customer premises 720 may power the first DPU 710 via the one or more first drop lines 725. The one or more first customer premises 720 may further be communicatively coupled to the access network 705 via the first DPU 710. Accordingly, both data and reverse power may be carried over the one or more first drop lines 725.

In various embodiments, the first DPU 710 may include at least part of an existing copper-wire based pedestal, cabinet, handhole, or other enclosure located near the one or more first customer premises 720. Accordingly, the DPU 710 may be configured to interface with existing copper wire infrastructure at the pedestal, cabinet, handhole, or other enclosure in a FTTdp arrangement, as known to those in the art, interfacing existing copper infrastructure to a fiber network and/or to a fiber or copper backhaul (e.g., xDSL backhaul). Thus, in various embodiments, the cascaded arrangement of the DPUs 710, 730, 750 may be configured to provide a GPON uplink for each of the respective one or more customer premises 720, 740, 760, over existing copper infrastructure, via the respective DPUs 710, 730, 750.

Accordingly, the system 700 may also include one or more cascaded downstream DPUs 730, 750. The one or more cascaded downstream DPUs 730, 750 may include a first downstream DPU 730. In various embodiments, the first downstream DPU 730 may be communicatively coupled to the service provider network 705 via a backhaul connection 735 to the first DPU 710. In various embodiments, the backhaul connection 735 may include, without limitation, a fiber optic backhaul and/or a copper backhaul connection. In some embodiments, the backhaul connection 735 may include, for example, a 10 G Ethernet and/or other GPON connection.

The first downstream DPU 730 may further be communicatively coupled to one or more second customer premises 740 via one or more second drop lines 745 (e.g., a second set of drop cables). In some embodiments, the one or more second drop lines 745 may be configured to provide power to the first downstream DPU 730. In other words, the one or more second customer premises 740 may power the first downstream DPU 730 via the one or more second drop lines 745. In various embodiments, the one or more second drop lines 745 may include existing copper wire infrastructure to the one or more second customer premises 740, such as twisted pair and/or coaxial cable wiring Similar to the first DPU 710, the first downstream DPU 730 may include at least part of an existing copper-wire based pedestal, cabinet, handhole, or other enclosure located near the one or more second customer premises 740. Accordingly, the first downstream DPU 730, like the first DPU 710, may be configured to interface with existing copper wire infrastructure at the pedestal, cabinet, handhole, or other enclosure, as known to those in the art, interfacing existing copper infrastructure. However, in contrast with the first DPU 710, the first downstream DPU 730 may be coupled via the backhaul connection 735 to the first DPU 710, which may in turn be coupled to a fiber network and/or to a fiber or copper backhaul (e.g., xDSL backhaul). As will be described in greater detail with respect to FIG. 8, in some embodiments, the backhaul connection 735 may include, for example, a 10 G Ethernet jumper connection between a backhaul interface of the first downstream DPU 730 to a backhaul interface of the first DPU 710.

In some embodiments, one or more subsequent downstream DPUs 750 may be included in system 700. The one or more subsequent downstream DPUs may be communicatively coupled to the access network 705 via an immediately preceding upstream DPU. For example, the one or more subsequent downstream DPUs 750 may include a second downstream DPU that is coupled to the immediately preceding upstream DPU, which may be the first downstream DPU 730. Similarly, a third downstream DPU of the one or more subsequent downstream DPUs 750 may be coupled to an immediately preceding upstream DPU, which may be the second downstream DPU.

According to various embodiments, the one or more subsequent DPUs 750 may include a second downstream DPU to an n-th downstream DPU. For example, in some embodiments, the cascaded chain of DPUs may include up to eight subsequent downstream DPUs 750, which including the first downstream DPU 730 and first DPU 710 may include a total of up to ten DPUs.

The one or more subsequent downstream DPUs 750 may be communicatively coupled via respective one or more backhaul connections 755 to an immediately preceding DPU. In various embodiments, the backhaul connection 755 may include, without limitation, a fiber optic backhaul and/or a copper backhaul connection. For example, in some embodiments, the respective one or more backhaul connection 755 may be a 10 G Ethernet jumper to an immediately preceding upstream DPU, as previously described. In various embodiments, the length of the backhaul connections 735, 755 may span a physical length according to a desired bandwidth of the backhaul connection 735, 755. For example, in some embodiments, the backhaul connections 735, 755 may be 1000 feet or less. In other embodiments, the upper limit of the length of the backhaul connection 735, 755 my range between 500-1500 feet in length.

In various embodiments, each of the one or more subsequent downstream DPUs 750 may be communicatively coupled respectively to one or more third customer premises 760 via one or more third drop lines 765 (e.g., respective drop cables to from respective DPUs to respective customer premises). In some embodiments, the one or more third drop lines 765 may be configured to provide power to the respective one or more subsequent downstream DPUs 750. In various embodiments, the one or more third drop lines 765 may include existing copper wire infrastructure to the one or more third customer premises 760.

As previously described with respect to the first downstream DPU 730, the one or more subsequent downstream DPUs 750 may include at least part of an existing copper-wire based pedestal, cabinet, handhole, or other enclosure located near the respective one or more third customer premises 740. Accordingly, each of the one or more subsequent downstream DPUs 750 may be configured to interface with existing copper wire infrastructure at the pedestal, cabinet, handhole, or other enclosure, as known to those in the art, interfacing existing copper infrastructure. In other embodiments, multiple DPUs may be configured to be coupled to a respective set of drop lines within a single pedestal, cabinet, handhole, or other telecom enclosure.

In some embodiments, each set of one or more third drop lines 765 may be configured to provide power to a respective downstream DPU of the one or more downstream DPUs 750. For example, a second downstream DPU of the one or more downstream DPUs 750 may be associated with a respective set of the one or more third customer premises. Accordingly, in some embodiments, the respective set of the one or more third customer premises may be configured to power the second downstream DPU.

In some examples, the access network 705 and the first DPU 710 may be associated with or owned by the same service provider. In other cases, the access network 705 and the first DPU 710 may be associated with or owned by different service providers. Further, in some embodiments, the one or more services transmitted by the service provider network 710 may be associated with the same service provider that is associated with the first DPU 710. Alternatively, in other embodiments, the one or more services transmitted by the service provider network 710 may be associated with a service provider that is different from the service provider associated with the first DPU 710.

Next, the first DPU 710 may transmit the one or more services from the access network 705 to the one or more first customer premises 720 and the one or more second DPUs 730. In some embodiments, the first DPU 710 may determine at least one first service of the one or more services associated with at least one first customer premises of the one or more customer premises 725. The first DPU 710 may additionally determine at least one second service of the one or more services is associated with the first downstream DPU 730. Next, based on a determination that at least one first service is associated with a first customer premises, the first DPU 710 may transmit the at least one first service of the one or more services to the at least one first customer premises of the one or more customer premises 725. Based on a determination that at least one second service is associated with the first downstream DPU 730, the first DPU 710 may additionally transmit the at least one second service of the one or more services associated to the at least one second DPU of the one or more second DPUs 730, for example, via the backhaul connection 735. The first downstream DPU 730 may receive the one or more services, via the first DPU 710, from the access network 705. Next, the first downstream DPU 730 may transmit the one or more services to the one or more second customer premises 740.

In some embodiments, the first downstream DPU 730 may be communicatively coupled to one or more optional subsequent downstream DPUs 750. The first downstream DPU 730 may receive the one or more services from the first DPU 710 and transmit the one or more services from the first DPU 710 to the one or more subsequent downstream DPUs 750. The one or more subsequent downstream DPUs 750 may be configured to receive the one or more services, via corresponding upstream DPUs, from the access network 705, and transmit the one or more services to then respective one or more third customer premises 760.

This chaining of DPUs may be used to effectively transmit one or more services from a service provider network to multiple customer premises without having to lay respective lines to each DPU to be coupled to an access network. Rather, a backhaul connection between DPUs may be utilized given sufficient bandwidth on the one or more first line 715.

Figure 8:
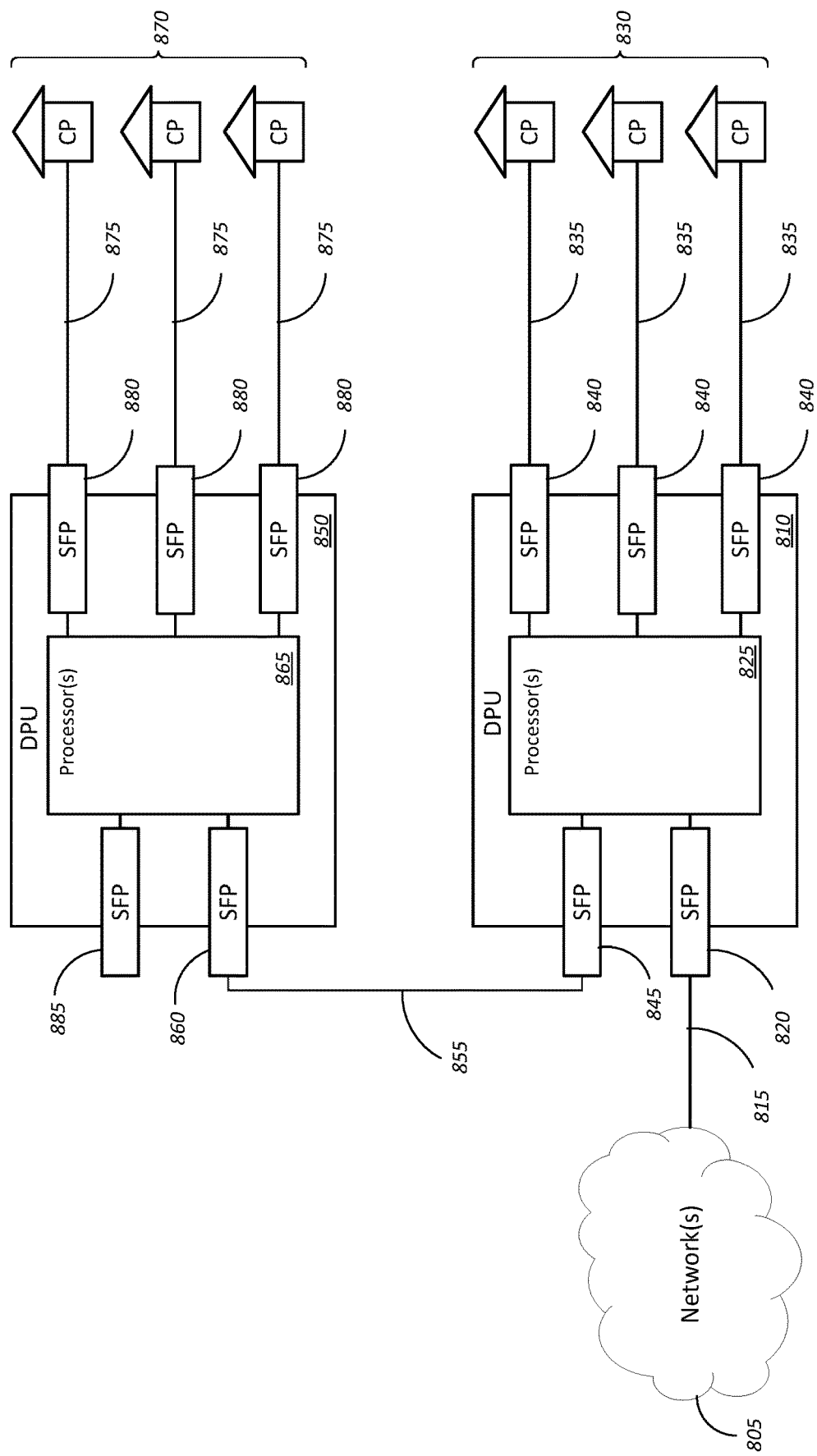
FIG. 8 is another schematic block diagram of a system for distributing one or more services to a customer premises via one or more distribution point units, in accordance with various embodiments.

FIG. 8 is a schematic block diagram of an example implementation of a cascaded DPU system 800 for distributing one or more services from access network 805. The one or more services may include, without limitation, one or more data services, one or more voice services, one or more video service delivered over existing infrastructure (e.g., delivered over-the-top). System 800 may include a first DPU 810. The first DPU 810 may be communicatively coupled to one or more access network(s) 805 through backhaul connection 815 via one or more backhaul SFP connector 820. The first DPU 810 may further include one or more processor(s) 825.

System 800 may additionally include one or more first customer premises 830. The one or more first customer premises 830 may be communicatively coupled to the first DPU 810 via one or more drop pairs 835 and via one or more drop pair SFP connections 840. The first DPU 810 may additionally include one or more distribution pair SFPs 845 configured to couple the first DPU 810 to a downstream DPU 850. The downstream DPU 850 may be communicatively coupled to the first DPU 810 via one or more distribution pairs 855 via a corresponding one or more backhaul SFP 860 of the downstream DPU 850. The downstream DPU 850 may additionally comprise one or more processor(s) 865.

The downstream DPU 850 may be communicatively coupled to one or more second customer premises 870 via one or more drop pairs 875 and via one or more the one or more drop SFPs 880. The downstream DPU 850 may further include one or more distribution pair SFP 885 configured to support a connection to a subsequent downstream DPU (not shown).

Accordingly, in one example, a first DPU 810 may be configured to provide an xPON (e.g., GPON, etc.) uplink to the access network 805. The xPON uplink, accordingly, may be provided via the backhaul connection 815. In various embodiments, the backhaul connection 815 may include a fiber optic backhaul connection, or alternatively, a copper access feed. Thus, the first DPU 810 may include and/or be configured to interface with an xPON ONT device configured to be coupled to an OLT (e.g., the access network 805). The first DPU 810 may therefore, in some embodiments, be configured to receive the backhaul connection 815 via the one or more backhaul SFPs 820.

The first DPU 810 may, thus, receive downstream communications from the access network 805. Communications received from the access network 805 may accordingly be received by the one or more processors 825. The one or more processors 825 may, for example, include, without limitation, an Ethernet switch, drivers, PHY transceivers, reverse power and power management systems, or an SoC that includes one or more of the above systems. The one or more processors 825 may, accordingly, be configured to determine where to route communications. For example, the one or more processors 825 may determine whether downstream traffic should be transmitted to the one or more first customer premises 830 or routed to the downstream DPU 850. If it is determined that the traffic is addressed to the one or more first customer premises 830, the one or more processors 825 may further be configured to determine which of the one or more first customer premises 830 to which the data is addressed. Accordingly, the one or more processors 825 may be configured to transmit data via the appropriate drop pair SFP 840.

The one or more drop pair SFPs 840 may, in various embodiments, be configured to interface with existing copper infrastructure. Thus, the drop pairs 835 may include existing copper infrastructure previously coupling an existing pedestal, cabinet, handhole, or other telecom enclosure to the one or more first customer premises 830. Drop pairs 835 may, therefore, include without limitation, cat 1 and/or cat 3 twisted pair cabling. Accordingly, in various embodiments, one or more drop pair SFPs 840 may be configured to appropriately couple to respective cat 1/cat 3 cables. Thus, in some embodiments, the one or more processors 825 may include, for example, a G.now switch configured to provide a G.now interface via the one or more drop pair SFPs 840.

Similarly, if it is determined that communications should be provided to the downstream DPU 850, the one or more processors 825 may be configured to route communications to the downstream DPU 850 via the one or more distribution pair SFPs 845 over the one or more distribution pairs 855. In some embodiments, the first DPU 810 and downstream DPU 850 may be in the same pedestal, cabinet, handhole and/or other telecom enclosure. In such an arrangement, the one or more distributions pairs 855 may include 10 G Ethernet jumper cables (fiber or copper) to couple the first DPU 810 to the downstream DPU 850, and in some embodiments, operate in "G.hn mode." Alternatively, in a cascaded arrangement in which the first DPU 810 and downstream DPU 850 are coupled to separate respective pedestals, cabinets, handholes, and/or other enclosures, the one or more distribution pairs 855 may include appropriate copper distribution pairs, such as, without limitation, cat 3, cat 5, cat 5e, cat 6, etc. Accordingly, the backhaul connection between the DPUs 810, 850 may be a G.now connection between respective one or more distribution pair SFPs 845 and one or more backhaul SFPs 860.

Thus, the one or more processors 865 of the downstream DPU 850 may similarly include, without limitation, an Ethernet switch, drivers, PHY transceivers, reverse power and power management systems, or an SoC that includes one or more of the above systems. The one or more processors 865 may, accordingly, be configured to determine that the traffic is addressed to the one or more first customer premises 870, and to transmit data via the appropriate drop pair SFP 880 associated with the one or more second customer premises 870. As described with respect to the first DPU 810, the drop pairs 875 may include without limitation, cat 1 and/or cat 3 twisted pair cabling. Accordingly, in various embodiments, one or more drop pair SFPs 880 may be configured to appropriately couple to respective cat 1/cat 3 cables. Thus, in some embodiments, the one or more processors 865 may include, for example, a G.now switch configured to provide a G.now interface via the one or more drop pair SFPs 880.

Similarly, if it is determined that communications should be provided to a subsequent downstream DPU (not shown), the one or more processors 865 may be configured to route communications to the subsequent downstream DPU via the one or more distribution pair SFPs 885. As described in previously, in various embodiments, the DPUs 810, 850 may be configured to establish respective G.now connections to respective G.now/G.hn bridge devices over the respective one or more drop pairs 835, 875.

In some embodiments, the first DPU 810 may contain a processor 825 and a non-transitory computer readable media comprising instructions executable by the processor 825 to determine at least one first service associated with at least one first customer premises of the one or more customer premises 830. The first DPU 810 may additionally determine at least one second service of the one or more services associated with the downstream DPU 850. Based on a determination that at least one first service is associated with a first customer premises, the first DPU 810 may be configured to allow the at least one first service to be provided to the at least one first customer premises of the one or more customer premises 830. Based on a determination that at least one second service is associated with the downstream DPU 850, the first DPU 810 may transmit the at least one second service of the one or more services associated to the downstream DPU 850. Upstream communications received by the first DPU 810 from the first premises may, similarly, be transmitted to the access network 805. Upstream communications received by the downstream DPU 850 from the second premises may be transmitted to the first DPU 810 via the one or more distribution pair 855. The first DPU 810 may, in turn, transmit upstream traffic from the second premises received from the downstream DPU 850 to the access network 805 via an appropriate backhaul connection 815.

In some embodiments, the downstream DPU 850 may be configured to receive the one or more services from the first DPU 810 and transmit the one or more services from the first DPU 810 to a subsequent downstream DPU and/or to an appropriate customer premises of the one or more second customer premises 870.

In some instances, the one or more processors 865 of the downstream DPU 850 may include and/or be coupled to non-transitory computer readable media comprising instructions executable by the one or more processors 865 to determine at least one third service of the one or more services associated with at least one customer premises of the one or more second customer premises 870. The downstream DPU 850 may additionally determine at least one fourth service of the one or more services associated with a subsequent downstream DPU. Based on a determination that at least one third service is associated with a first customer premises, the downstream DPU 850 may transmit the at least one third service of the one or more services to an appropriate customer premises of the one or more second customer premises 870. Based on a determination that at least one second service is associated with a customer premises served by the subsequent downstream DPU, the downstream DPU 850 may additionally transmit the at least one fourth service of the one or more services the subsequent downstream DPU.

Figure 9A:
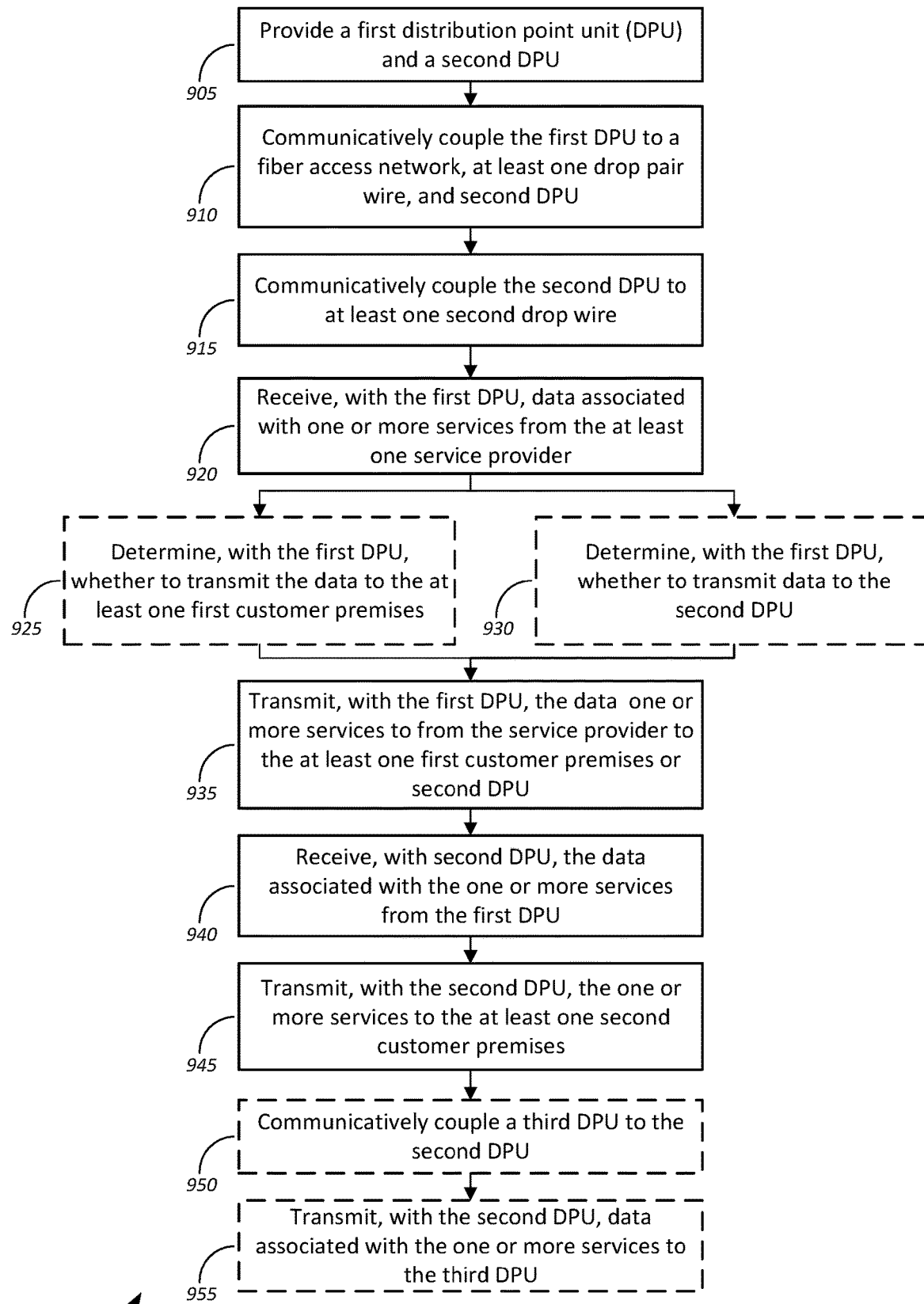
FIG. 9A is a flow diagram of a method for establishing network access via one or more distribution point units, in accordance with various embodiments.

FIG. 9A is a flow diagram of a method 900A for establishing network access via one or more distribution point units, in accordance with various embodiments. The method 900A may begin, at block 905, by providing a first DPU and a second DPU. At block 910, the method 900 may continue, by communicatively coupling the first DPU to a fiber access network. The first DPU may further be coupled to at least one drop wire to a respective at least one customer premises, and at least one second DPU.

At block 915, the method 900A may continue by communicatively coupling the at least one second DPU to at least one second drop wire to a respective at least one second customer premises. Next, method 900, at block 920, may receive with the first DPU data associated with one or more services from the service provider. At optional block 925, it is determined, by the first DPU, to transmit the data to the at least one first customer premises. At optional block 930, the method 900A may determine to transmit the data to the second DPU. service of the one or more services associated with the least one second distribution point unit. Accordingly, in various embodiments, the first DPU may be configured to determine whether data received from the access network is addressed to one of the at least one first customer premises or the at least one second customer premises associated with the second DPU.

In some embodiments, method 900A, at block 935 may include transmitting, with the first DPU, the data associated with the one or more services from to the at least one first customer premises via one or more first drop wires or the second DPU based on the previous determination. In some embodiments, based on a determination that the one or more services are associated with the at least one first customer premises, the first DPU may transmit the data associated with the one or more services to the at least one first customer premises via the one or more first drop wires. Based on a determination that the one or more services is associated with the at least one second customer premises, the first DPU may transmit data associated with the one or more services to the second DPU.

At block 940, the method continues by receiving, with the second DPU, the data associated with the one or more services from the first DPU, responsive to a determination that the one or more services are associated with the at least one second customer premises. The method 900A continues, at block 945, by transmitting, with the second DPU, the one or more services to the at least one second customer premises. At optional block 950, the second DPU may further be coupled to a third DPU. As previously described, in various embodiments, the third DPU may be a downstream DPU coupled to the second DPU via a respective distribution pair/backhaul connection. At optional block 955, the method 900 may continue by transmitting, with the second DPU, data associated with the one or more services to the third DPU. The third DPU may, accordingly, be configured to transmit the data associated with the one or more services to at least one third customer premises.

Figure 9B:
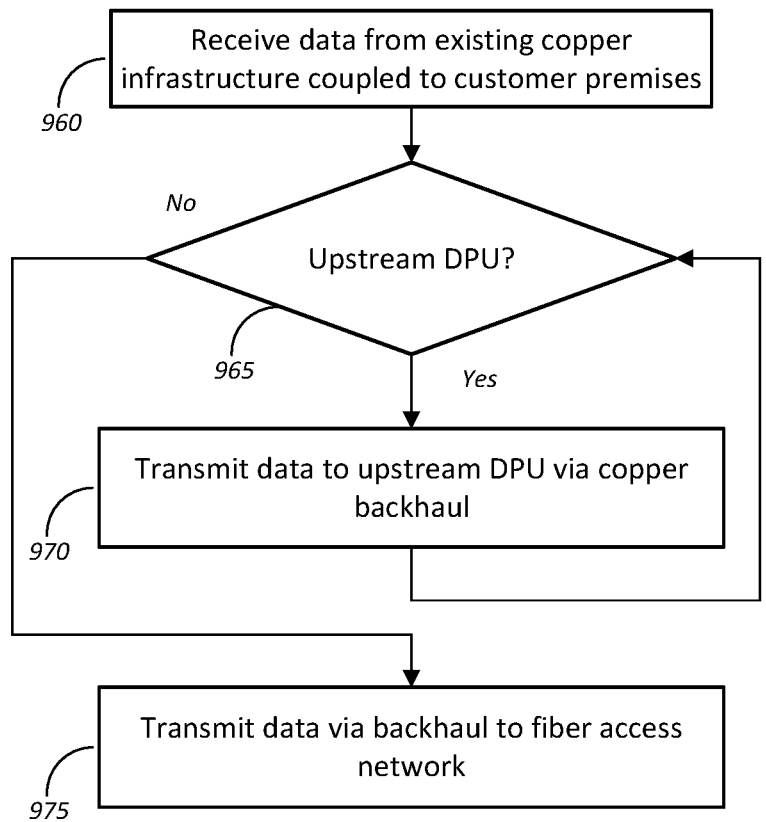
FIG. 9B is a flow diagram of a method for providing upstream network access to a customer premises via one or more distribution point units, in accordance with various embodiments.

FIG. 9B is a flow diagram of a method 900B for providing upstream network access to a customer premises via one or more distribution point units, in accordance with various embodiments. The method 900B begins, at block 960, by receiving, via a DPU, data from existing copper infrastructure coupled to a customer premises. At decision block 965, it may be determined whether an upstream DPU is present. If an upstream DPU is present, at block 970, the method 900B continues by transmitting the data to the upstream DPU via a copper backhaul. It then again determined whether another upstream DPU is present. If an upstream DPU is not present, the method 900B continues, at block 975, by transmitting data to the fiber access network via a backhaul connection to the fiber access network. As previously described, the backhaul connection may couple a first DPU of a cascaded chain of DPUs to the access network. Suitable backhaul connections may include, without limitation, a fiber optic backhaul connection or a suitable copper xDSL access feed.

Figure 10:
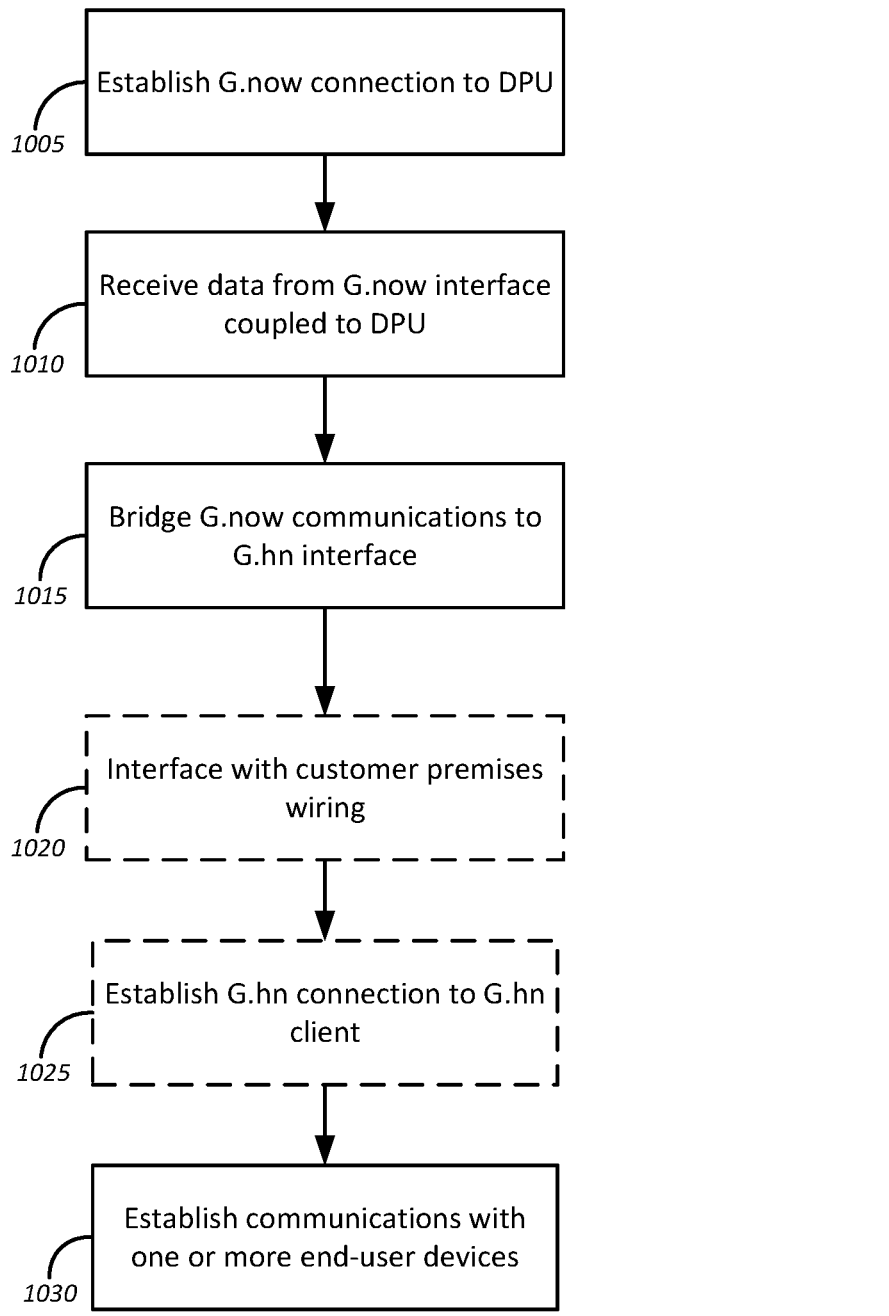
FIG. 10 is a flow diagram of a method of network access management, in accordance with various embodiments.

FIG. 10 is a flow diagram of a method 1000 of network access management, in accordance with various embodiments. The method 1000 begins, at block 1005, by establishing, via a G.now/G.hn bridge device, a G.now connection to a DPU. In various embodiments, the G.now/G.hn bridge device may be coupled to the DPU via existing copper wire infrastructure. For example, as previously described, the G.now/G.hn bridge may be coupled to the DPU via one or more drop cables between the DPU and a customer premises.

At block 1010, the method 1000 continues by receiving data from the G.now interface coupled to the DPU. At block 1015, data received from the G.now interface is bridged to a G.hn interface. As previously described, in various embodiments, the G.now/G.hn bridge may be configured to bridge communications from the DPU/access network to a local area network of a respective subscriber. Accordingly, the method 1000 continues, at optional block 1020, by interfacing with customer premises wiring via the G.hn interface. As previously described, the customer premises may include existing copper wire infrastructure to which the G.now/G.hn bridge may be coupled, such as twisted pair (e.g., cat 3, cat 5, cat 5e, cat 6, etc.), coaxial cable, or in some further examples, a power circuit/powerline of the customer premises. In some embodiments, the G.now/G.hn bridge may be coupled to the customer premises wiring via an NID, or in the examples of PLC bridging, to the power/electrical circuit of a customer premises.

Figure 11:
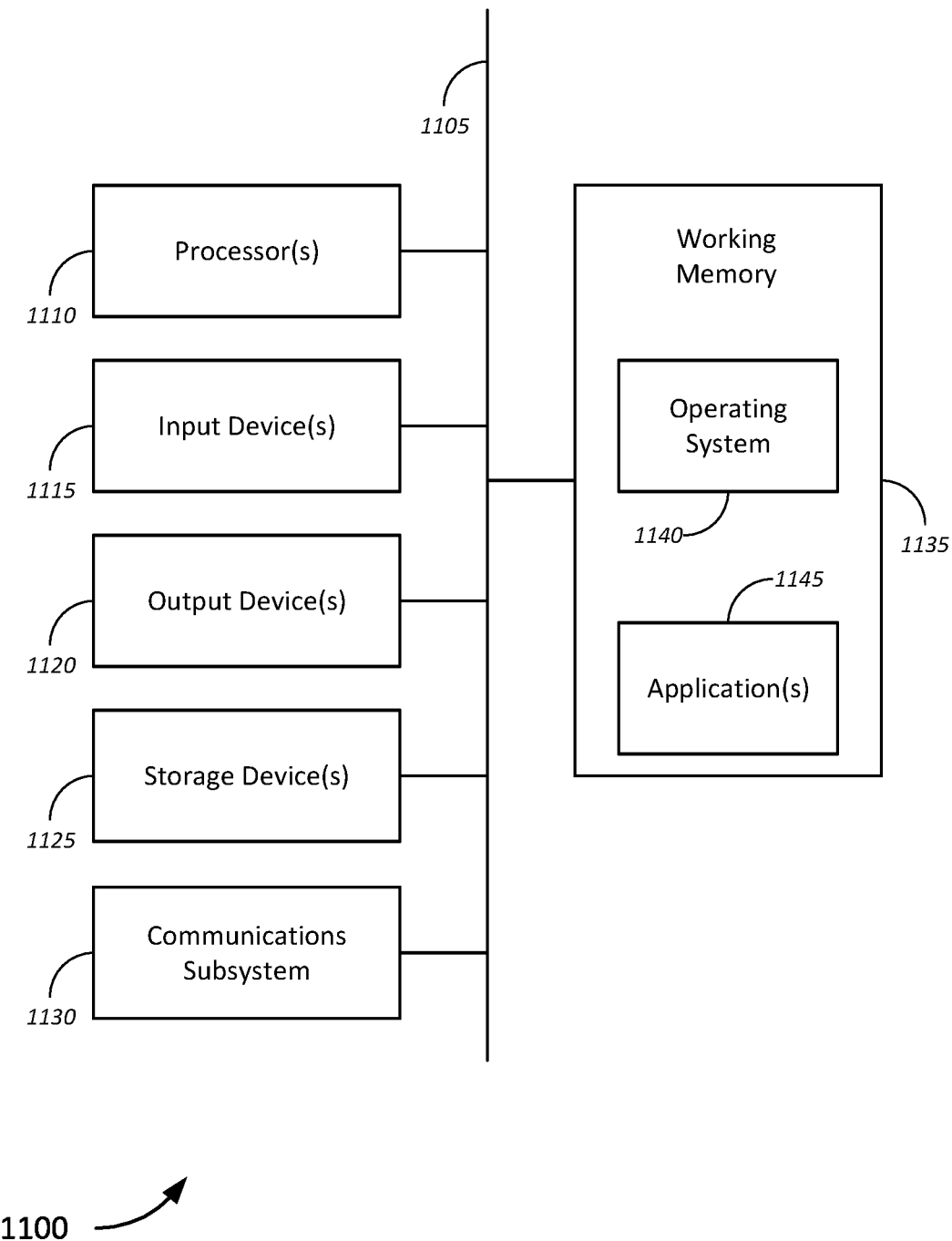
FIG. 11 is a schematic block diagram of a computer system for a network access system, in accordance with various embodiments.

At optional block 1025, the method 1000 may continue by establishing a G.hn connection to a G.hn client. As previously described, in some embodiments, the G.now/G.hn bridge may further be configured to function as a G.hn master to a G.hn client on the customer LAN. The G.hn client may be configured to be coupled to the G.hn master, and to support one or more end-user devices on the customer network. Accordingly, at block 1030, the method 1000 may continue by establishing communications with one or more end-user devices via the G.hn client device. As previously described, the G.hn client device may, for example, include an RJ45 interface configured to support wired connections to an end-user device. The G.hn client device may further include one or more Wi-Fi or other wireless transceivers for supporting FIG. 11 is a schematic block diagram of a computer system 1100 for a network access system, in accordance with various embodiments. FIG. 11 provides a schematic illustration of one embodiment of a computer system 1100, such as the DPU, switch controller, G.now/G.hn bridge, G.hn client, and reverse power device, which may perform the methods provided by various other embodiments, as described herein. It should be noted that FIG. 11 only provides a generalized illustration of various components, of which one or more of each may be utilized as appropriate. FIG. 11, therefore, broadly illustrates how individual system elements may be implemented in a relatively separated or relatively more integrated manner.

The computer system 1100 includes multiple hardware elements that may be electrically coupled via a bus 1105 (or may otherwise be in communication, as appropriate). The hardware elements may include one or more processors 1110, including, without limitation, one or more general-purpose processors and/or one or more special-purpose processors (such as microprocessors, digital signal processing chips, graphics acceleration processors, and microcontrollers); one or more input devices 1115, which include, without limitation, a mouse, a keyboard, one or more sensors, and/or the like; and one or more output devices 1120, which can include, without limitation, a display device, and/or the like.

The computer system 1100 may further include (and/or be in communication with) one or more storage devices 1125, which can comprise, without limitation, local and/or network accessible storage, and/or can include, without limitation, a disk drive, a drive array, an optical storage device, solid-state storage device such as a random-access memory ("RAM") and/or a read-only memory ("ROM"), which can be programmable, flash-updatable, and/or the like. Such storage devices may be configured to implement any appropriate data stores, including, without limitation, various file systems, database structures, and/or the like.

The computer system 1100 may also include a communications subsystem 1130, which may include, without limitation, a modem, a network card (wireless or wired), an IR communication device, a wireless communication device and/or chipset (such as a Bluetooth™ device, an 802.11 device, a WiFi device, a WiMax device, a WWAN device, a low-power (LP) wireless device, a Z-Wave device, a ZigBee device, cellular communication facilities, etc.). The communications subsystem 1130 may permit data to be exchanged with a network (such as the network described below, to name one example), with other computer or hardware systems, between data centers or different cloud platforms, and/or with any other devices described herein. In many embodiments, the computer system 1100 further comprises a working memory 1135, which can include a RAM or ROM device, as described above.

The computer system 1100 also may comprise software elements, shown as being currently located within the working memory 1135, including an operating system 1140, device drivers, executable libraries, and/or other code, such as one or more application programs 1145, which may comprise computer programs provided by various embodiments (including, without limitation, various applications running on the various server, LP wireless device, control units, and various secure devices as described above), and/or may be designed to implement methods, and/or configure systems, provided by other embodiments, as described herein. Merely by way of example, one or more procedures described with respect to the method(s) discussed above may be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code may be encoded and/or stored on a non-transitory computer readable storage medium, such as the storage device(s) 1125 described above. In some cases, the storage medium may be incorporated within a computer system, such as the system 1100. In other embodiments, the storage medium may be separate from a computer system (i.e., a removable medium, such as a compact disc, etc.), and/or provided in an installation package, such that the storage medium can be used to program, configure, and/or adapt a general purpose computer with the instructions/code stored thereon. These instructions may take the form of executable code, which is executable by the computer system 1100 and/or may take the form of source and/or installable code, which, upon compilation and/or installation on the computer system 1100 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, single board computers, FPGAs, ASICs, and SoCs) may also be used, and/or particular elements may be implemented in hardware, software (including portable software, such as applets, etc.), or both. Further, connection to other computing devices such as network input/output devices may be employed.

As mentioned above, in one aspect, some embodiments may employ a computer or hardware system (such as the computer system 1100) to perform methods in accordance with various embodiments of the invention. According to a set of embodiments, some or all of the procedures of such methods are performed by the computer system 1100 in response to processor 1110 executing one or more sequences of one or more instructions (which may be incorporated into the operating system 1140 and/or other code, such as an application program 1145 or firmware) contained in the working memory 1135. Such instructions may be read into the working memory 1135 from another computer readable medium, such as one or more of the storage device(s) 1125. Merely by way of example, execution of the sequences of instructions contained in the working memory 1135 may cause the processor(s) 1110 to perform one or more procedures of the methods described herein.

The terms "machine readable medium" and "computer readable medium," as used herein, refer to any medium that participates in providing data that causes a machine to operate in a specific fashion. In an embodiment implemented using the computer system 1100, various computer readable media may be involved in providing instructions/code to processor(s) 1110 for execution and/or may be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 1125. Volatile media includes, without limitation, dynamic memory, such as the working memory 1135. In some alternative embodiments, a computer readable medium may take the form of transmission media, which includes, without limitation, coaxial cables, copper wire and fiber optics, including the wires that comprise the bus 1105, as well as the various components of the communication subsystem 1130 (and/or the media by which the communications subsystem 1130 provides communication with other devices). In an alternative set of embodiments, transmission media can also take the form of waves (including, without limitation, radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 1110 for execution. Merely by way of example, the instructions may initially be carried on a magnetic disk and/or optical disc of a remote computer. A remote computer may load the instructions into its dynamic memory and send the instructions as signals over a transmission medium to be received and/or executed by the computer system 1100. These signals, which may be in the form of electromagnetic signals, acoustic signals, optical signals, and/or the like, are all examples of carrier waves on which instructions can be encoded, in accordance with various embodiments of the invention.

The communications subsystem 1130 (and/or components thereof) generally receives the signals, and the bus 1105 then may carry the signals (and/or the data, instructions, etc. carried by the signals) to the working memory 1135, from which the processor(s) 1110 retrieves and executes the instructions. The instructions received by the working memory 1135 may optionally be stored on a storage device 1125 either before or after execution by the processor(s) 1110.

Figure 12:
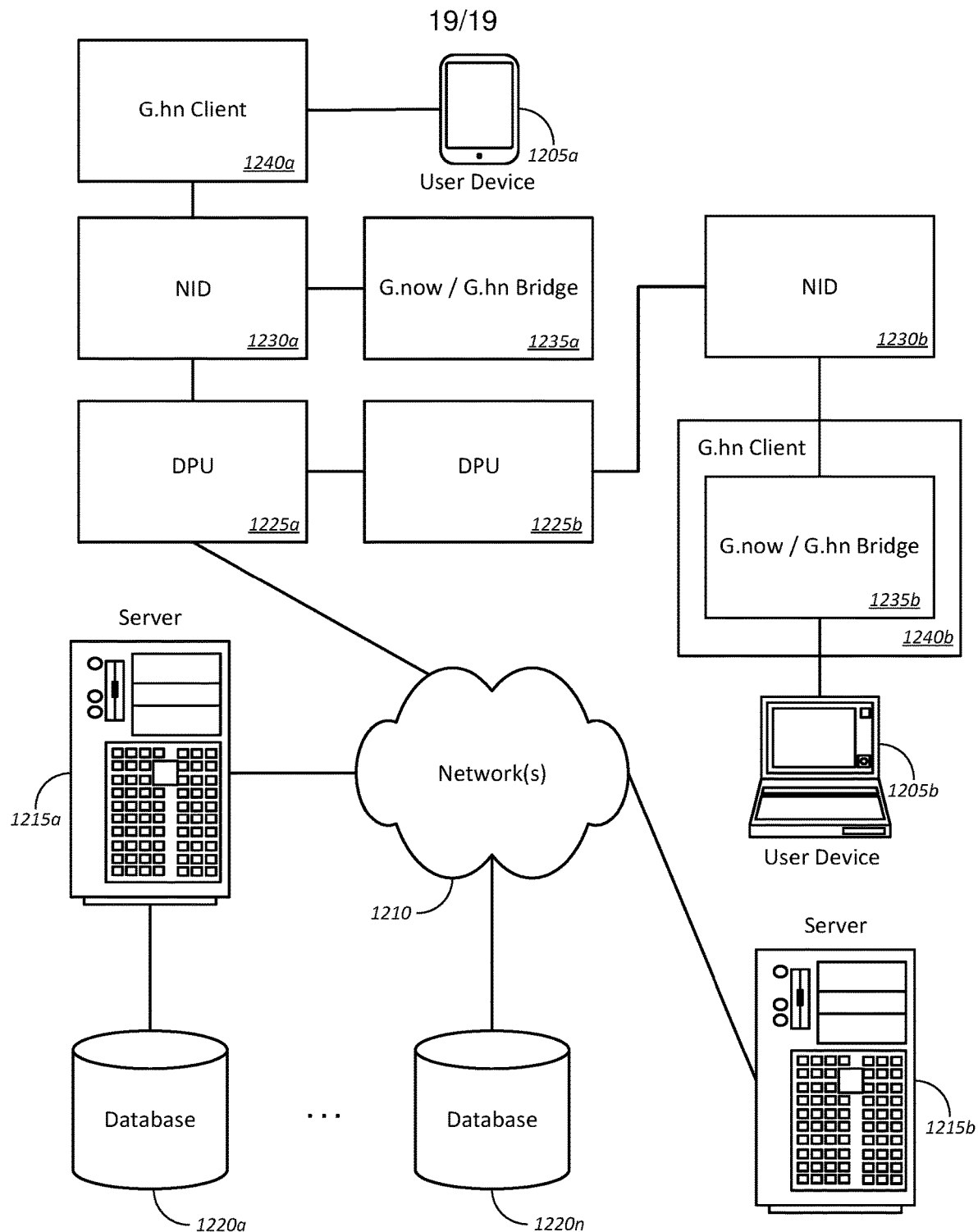
FIG. 12 is a schematic block diagram illustrating system of networked computer devices, in accordance with various embodiments.

FIG. 12 is a block diagram illustrating a networked system of computing systems, which may be used in accordance with various embodiments. The system 1200 may include one or more user devices 1205. A user device 1205 may include, merely by way of example, desktop computers, single-board computers, tablet computers, laptop computers, handheld computers, and the like, running an appropriate operating system. User devices 1205 may further include external devices, remote devices, servers, and/or workstation computers running any of a variety of operating systems. In some embodiments, the operating systems may include commercially-available UNIX™ or UNIX-like operating systems. A user device 1205 may also have any of a variety of applications, including one or more applications configured to perform methods provided by various embodiments, as well as one or more office applications, database client and/or server applications, and/or web browser applications. Alternatively, a user device 1205 may include any other electronic device, such as a thin-client computer, Internet-enabled mobile telephone, and/or personal digital assistant, capable of communicating via a network (e.g., the network(s) 1210 described below) and/or of displaying and navigating web pages or other types of electronic documents. Although the exemplary system 1200 is shown with two user devices 1205, any number of user devices 1205 may be supported.

Certain embodiments operate in a networked environment, which can include a network(s) 1210. The network(s) 1210 can be any type of network familiar to those skilled in the art that can support data communications, such as an access network, and using any of a variety of commercially-available (and/or free or proprietary) protocols, including, without limitation, MQTT, CoAP, AMQP, STOMP, DDS, SCADA, XMPP, custom middleware agents, Modbus, BACnet, NCTIP 1213, Bluetooth, Zigbee/Z-wave, TCP/IP, SNA™, IPX™, and the like. Merely by way of example, the network(s) 1210 can each include a local area network ("LAN"), including, without limitation, a fiber network, an Ethernet network, a Token-Ring™ network and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network may include an access network of the service provider (e.g., an Internet service provider ("ISP")). In another embodiment, the network may include a core network of the service provider, management network, and/or the Internet.

Embodiments can also include one or more server computers 1215. Each of the server computers 1215 may be configured with an operating system, including, without limitation, any of those discussed above, as well as any commercially (or freely) available server operating systems. Each of the servers 1215 may also be running one or more applications, which can be configured to provide services to one or more clients 1205 and/or other servers 1215.

Merely by way of example, one of the servers 1215 may be a data server, a web server, authentication server (e.g., TACACS, RADIUS, etc.), a cloud computing device(s), or the like, as described above. The data server may include (or be in communication with) a web server, which can be used, merely by way of example, to process requests for web pages or other electronic documents from user computers 1205. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 1205 to perform methods of the invention.

The server computers 1215, in some embodiments, may include one or more application servers, which can be configured with one or more applications, programs, web-based services, or other network resources accessible by a client. Merely by way of example, the server(s) 1215 can be one or more general purpose computers capable of executing programs or scripts in response to the user computers 1205 and/or other servers 1215, including, without limitation, web applications (which may, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 1205 and/or another server 1215.

In accordance with further embodiments, one or more servers 1215 can function as a file server and/or can include one or more of the files (e.g., application code, data files, etc.) necessary to implement various disclosed methods, incorporated by an application running on a user computer 1205 and/or another server 1215. Alternatively, as those skilled in the art will appreciate, a file server can include all necessary files, allowing such an application to be invoked remotely by a user computer, user device, or customer device 1205 and/or server 1215.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 1220a-1220n (collectively, "databases 1220"). The location of each of the databases 1220 is discretionary: merely by way of example, a database 1220a may reside on a storage medium local to (and/or resident in) a server 1215a (or alternatively, user device 1205). Alternatively, a database 1220n can be remote so long as it can be in communication (e.g., via the network 1210) with one or more of these. In a particular set of embodiments, a database 1220 can reside in a storage-area network ("SAN") familiar to those skilled in the art. In one set of embodiments, the database 1220 may be a relational database configured to host one or more data lakes collected from various data sources. Relational databases may include, for example, an Oracle database, that is adapted to store, update, and retrieve data in response to SQL-formatted commands. The database may be controlled and/or maintained by a database server.

The system 1200 may further include a first DPU 1225a, downstream DPU 1225b, one or more NIDs including NID 1230a, NID 1230n, G.now/G.hn bridges 1235a, 1235b, and G.hn clients 1240a, 1240b. As part of a network access system the DPU 1225 may be coupled to an access network (e.g., network 1210) associated with a service provider. The network 1210 may, for example, include an OLT or DSLAM to which the DPU 1225 may be coupled. The DPU 1225 may further be coupled to a provider side of respective NIDs 1230a-1230b. As previously described, the DPUs 1225a, 1225b may be configured to interface with existing drop lines to the respective NIDs 1230a, 1230b. The NIDs 1230a, 1230b may, in turn, be coupled to a respective G.now/G.hn bridge 1235a, 1235b.

In some embodiments, in the case of an external G.now/G.hn bridge 1235a, the service provider facing side of the NID may further be coupled to the G.now/G.hn bridge 1235a. The G.now/G.hn bridge 1235a may, in turn, provide be configured to provide a G.hn interface with the customer premises wiring, via the customer side of the NID 1230a. Thus, a G.hn interface of the G.now/G.hn bridge 1235a may be configured to be coupled with existing customer premises wiring via the NID 1230a. Thus, the G.now/G.hn bridge may bridge communications between the access network/DPU 1225a and the customer LAN. The NID 1230a may, in turn, be coupled to a G.hn client 1240a, which may in turn be configured to be coupled to user device 1205a. Thus, the G.hn client 1240a may be configured to allow a user device to communicate with the access network 1210.

The first DPU 1225a may further be coupled additional customer premises via a downstream DPU 1225b. In some embodiments, an interior G.now/G.hn bridge 1235b may be utilized to couple to a respective DPU, such as downstream DPU 1225b. The interior G.now/G.hn bridge 1235b may be part of a G.hn client 1240b. The G.hn client 1240b may, accordingly, be coupled to the customer side of the NID 1230b, which may in turn be coupled to the DPU 1225 on a service provider side. The G.hn client 1240b may, similarly, be coupled to user device 1205b. The G.hn client 1240b may, accordingly, allow the user device 1205b to communicate and/or access the network 1210 via a connection to the DPU 1225.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to certain structural and/or functional components for ease of description, methods provided by various embodiments are not limited to any single structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in sequentially for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a specific structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to one embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A system comprising:
   a first distribution point unit comprising:
   a first backhaul interface coupled to an access network via a backhaul connection;
   a first distribution interface coupled to a downstream distribution point unit;
   one or more first drop cable interfaces coupled to at least one first customer premises via at least one first drop cable;
   a first reverse power section;
   a first processor;
   a first non-transitory computer readable media comprising instructions executable by the first processor to:
   establish, via the at least one first drop cable, a first G.now connection to the at least one first customer premises;
   receive, via the first backhaul interface, data associated with one or more services from the access network;
   determine whether the one or more services should be provided to the at least one first customer premises;
   in response to determining that the one or more services are to be provided to the at least one first customer premises, transmit the data associated with the one or more services to the at least one first customer premises over the first G.now connection; and
   in response to determining that the one or more services are not associated with the at least one first customer premises, transmit, via the first distribution interface, the data associated with the one or more services to the downstream distribution point unit;
   a second distribution point unit communicatively coupled to the first distribution point unit, the second distribution point unit comprising:
   a second backhaul interface coupled to the first distribution interface of the first distribution point unit;
   a second distribution interface configured to be coupled to a subsequent downstream distribution point unit;
   one or more second drop cable interfaces coupled to at least one second customer premises via at least one second drop cable;
   a second reverse power section;
   a second processor;
   a second non-transitory computer readable media comprising instructions executable by the processor to:
   establish, via the at least one second drop cable, a second G.now connection to the at least one second customer premises;
   receive, via the first backhaul interface, data associated with the one or more services from the first distribution point unit;
   determine whether the one or more services should be provided to the at least one second customer premises;
   in response to determining that the one or more services are to be provided to the at least one second customer premises, transmit the data associated with the one or more services to the at least one second customer premises over the second G.now connection; and
   in response to determining that the one or more services are not associated with the at least one second customer premises, transmit, via the second distribution interface, the data associated with the one or more services to the subsequent downstream distribution point unit.

2. The system of claim 1, wherein the first non-transitory computer readable media further comprises instructions executable by the first processor to:
   receive, via the first G.now connection, upstream data from the at least one first customer premises; and
   transmit, via the first backhaul interface, the upstream data to the access network.

3. The system of claim 1, wherein the first non-transitory computer readable media further comprises instructions executable by the first processor to:
   receive, via the first distribution interface, upstream data from the second distribution point unit; and
   transmit, via the first backhaul interface, the upstream data to the access network.

4. The system of claim 1, wherein the second non-transitory computer readable media further comprises instructions executable by the second processor to:
   receive, via the second G.now connection, upstream data from the at least one second customer premises; and
   transmit, via the second backhaul interface, the upstream data to the first distribution point unit.

5. The system of claim 1, wherein the first distribution point unit, second distribution point unit, and the one or more services are associated with a first service provider, and wherein at least one of the access network, at least one first drop cable, and at least one second drop cable are associated with a second service provider different from the first service provider.

6. The system of claim 5, wherein the first DPU is coupled to a telecommunications enclosure associated with the second service provider, the telecommunications enclosure comprising the at least one first drop cables.

7. The system of claim 5, wherein the access network, associated with the second service provider, includes a network enhanced gateway associated with the first service provider, wherein the first distribution point unit is coupled to the network enhanced gateway via the first backhaul interface, wherein the network enhanced gateway is configured to deliver the one or more services over access network infrastructure of the second service provider to the second distribution point unit.

8. The system of claim 1, wherein the at least one first drop cable and the at least one second drop cable comprises a G.now connection medium, wherein the G.now connection medium includes one of category 1 or category 3 twisted pair cable.

9. The system of claim 1, wherein the backhaul connection comprises one of a fiber optic backhaul or an xDSL copper access feed.

10. The system of claim 1, wherein the first reverse power section is configured to receive, via the at least one first drop cable, a first reverse power feed from the at least one first customer premises, and wherein the second reverse power section is configured to receive, via the at least one second drop cable, a second reverse power feed from the at least one second customer premises.

11. The system of claim 1, wherein the one or more services comprise at least one over-the-top service.

12. The system of claim 1, wherein the first distribution point unit is disposed within a first pedestal and the second distribution point unit is disposed within a corresponding at least one second pedestal.

13. The system of claim 1, wherein the first distribution point unit is disposed within a first container disposed in a first ground surface and the second distribution point unit is disposed within at least one corresponding second container disposed in a second ground surface.

14. The system of claim 1, wherein the first distribution point unit is less than 1,000 feet away from the second distribution point unit.

15. The system of claim 1, wherein the at least one drop cable comprises a G.now connection medium, wherein the G.now connection medium includes one of category 1 or category 3 twisted pair cable, and wherein the backhaul connection comprises one of a fiber optic backhaul or an xDSL copper access feed.

16. An apparatus comprising:
a backhaul interface coupled to an access network via a backhaul connection;
a distribution interface coupled to a downstream distribution point unit;
one or more drop cable interfaces coupled to at least one customer premises via at least one drop cable;
a reverse power section;
a processor; and
a non-transitory computer readable media comprising instructions executable by the processor to:
establish, via the at least one drop cable, a G.now connection to the at least one customer premises;
receive, via the backhaul interface, data associated with one or more services from the access network;
determine whether the one or more services should be provided to the at least one customer premises;
in response to determining that the one or more services are to be provided to the at least one customer premises, transmit the data associated with the one or more services to the at least one customer premises over the G.now connection; and in response to determining that the one or more services are not associated with the at least one customer premises, transmit, via the distribution interface, the data associated with the one or more services to the downstream distribution point unit.

17. The apparatus of claim 16, wherein the backhaul interface is coupled to an upstream distribution point unit, which provides a backhaul feed to the access network.

18. The apparatus of claim 16, wherein the instructions are executable by the processor to:
receive, via the distribution interface, upstream data from the downstream distribution point unit; and
transmit, via the backhaul interface, the upstream data to the access network.

19. The apparatus of claim 16, wherein the instructions are executable by the processor to:
receive, via the G.now connection, upstream data from the at least one customer premises; and
transmit, via the backhaul interface, the upstream data to the access network.

20. A method comprising:
establishing, via a backhaul feed, a backhaul connection between a first distribution point unit and an access network;
establishing, via a distribution interface, a downstream connection to a downstream distribution point unit;
establishing, via a drop cable, a G.now connection between the first distribution point unit and at least one customer premises;
receiving, via the backhaul connection, data associated with one or more services from the access network;
determining whether the one or more services should be provided to the at least one customer premises;
in response to determining that the one or more services are to be provided to the at least one customer premises, transmitting, via the first distribution point unit, the data associated with the one or more services to the at least one customer premises over the G.now connection; and
in response to determining that the one or more services are not associated with the at least one customer premises, transmitting, via the first distribution point unit, the data associated with the one or more services to the downstream distribution point unit.

* * * * *